(12) United States Patent
Tanaka et al.

(10) Patent No.: US 6,310,613 B1
(45) Date of Patent: Oct. 30, 2001

(54) METHOD AND APPARATUS FOR CHANGING NUMERIC VALUES ON A DISPLAY DEVICE

(75) Inventors: Masato Tanaka; Seiji Kato, both of Tokyo (JP)

(73) Assignee: Yamatake Corporation, Tokyo (JP)

( * ) Notice: Subject to any disclaimer, the term of this patent is extended or adjusted under 35 U.S.C. 154(b) by 0 days.

(21) Appl. No.: 09/312,063

(22) Filed: May 17, 1999

(30) Foreign Application Priority Data

May 26, 1998 (JP) .................................................. 10-144779

(51) Int. Cl.[7] ........................................................ G09G 5/00
(52) U.S. Cl. ............................................. 345/173; 345/156
(58) Field of Search .................................. 345/145, 156, 345/157, 173, 174, 159, 160, 25, 33, 34; 178/18.05

(56) References Cited

U.S. PATENT DOCUMENTS

| 4,242,676 | * | 12/1980 | Piguet et al. | 345/174 |
| 4,862,151 | * | 8/1989 | Grauz et al. | 345/173 |
| 5,526,023 | * | 6/1996 | Sugimoto et al. | 345/173 |
| 6,121,959 | * | 9/2000 | Fukumoto et al. | 345/174 |

FOREIGN PATENT DOCUMENTS

| 0293291 | 11/1988 | (EP) . |
| 0326751 | 8/1989 | (EP) . |
| 2677783 | 12/1992 | (FR) . |

OTHER PUBLICATIONS

IBM Technical Disclosure Bulletin, "Enhanced Multi–Field Spin Button", vol. 36, No. 11, XP000424799, ISSN: 0018–8689, Nov. 1, 1993, p. 117.

* cited by examiner

Primary Examiner—Regina Liang
(74) Attorney, Agent, or Firm—Rothwell, Figg, Ernst & Manbeck

(57) ABSTRACT

A method for changing a numeric value displayed on a display device is adapted to select a numeric display area by pointing means and change the numeric value in accordance with a pointing signal that is provided from the pointing means in response to its sliding movement after the selection of the numeric display area.

9 Claims, 29 Drawing Sheets

FIG.3A
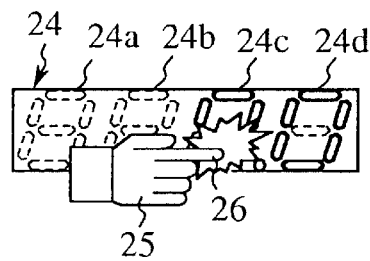
FIG.3B
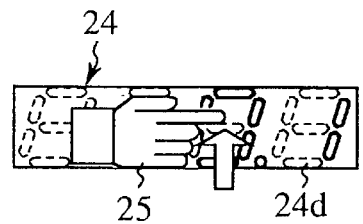
FIG.3C
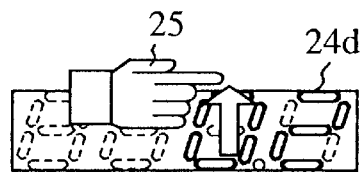
FIG.9A
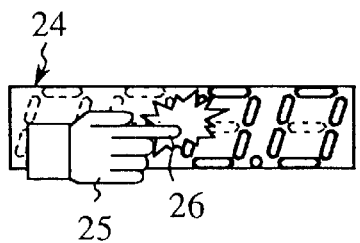
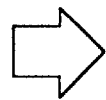
FIG.9B
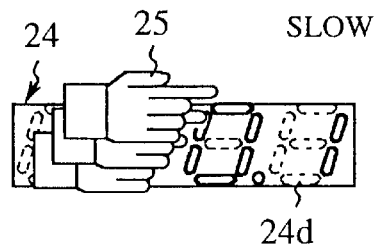
SLOW
FIG.9C
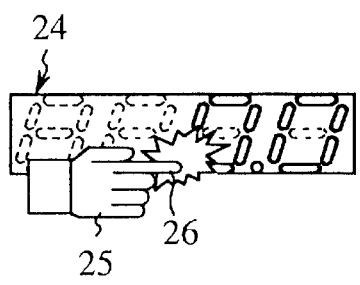
FIG.9D
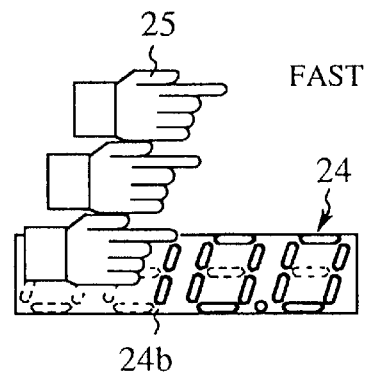
FAST

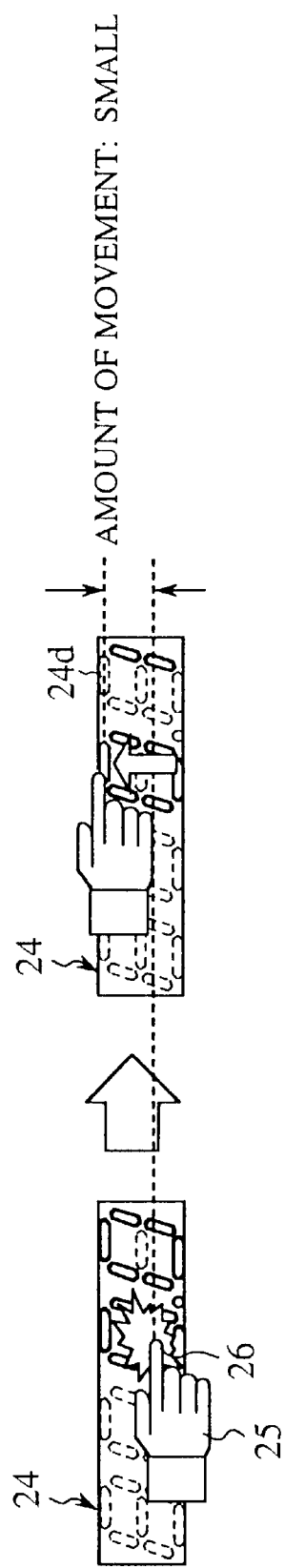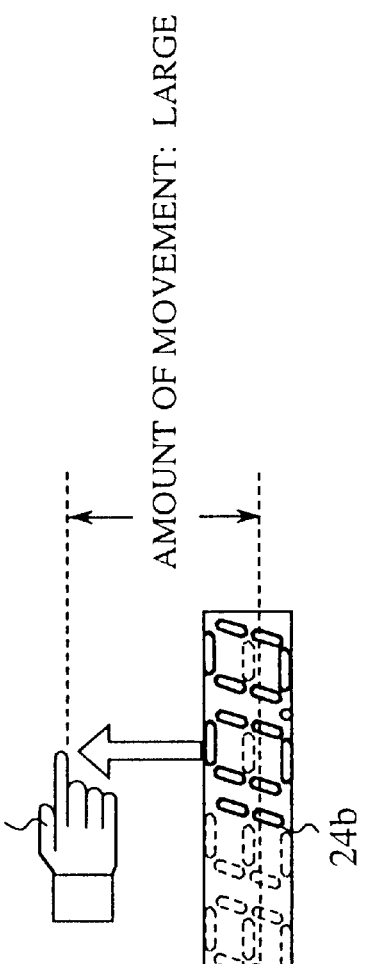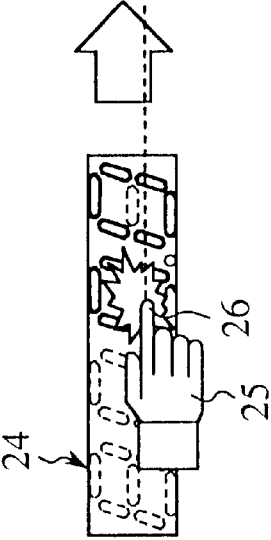

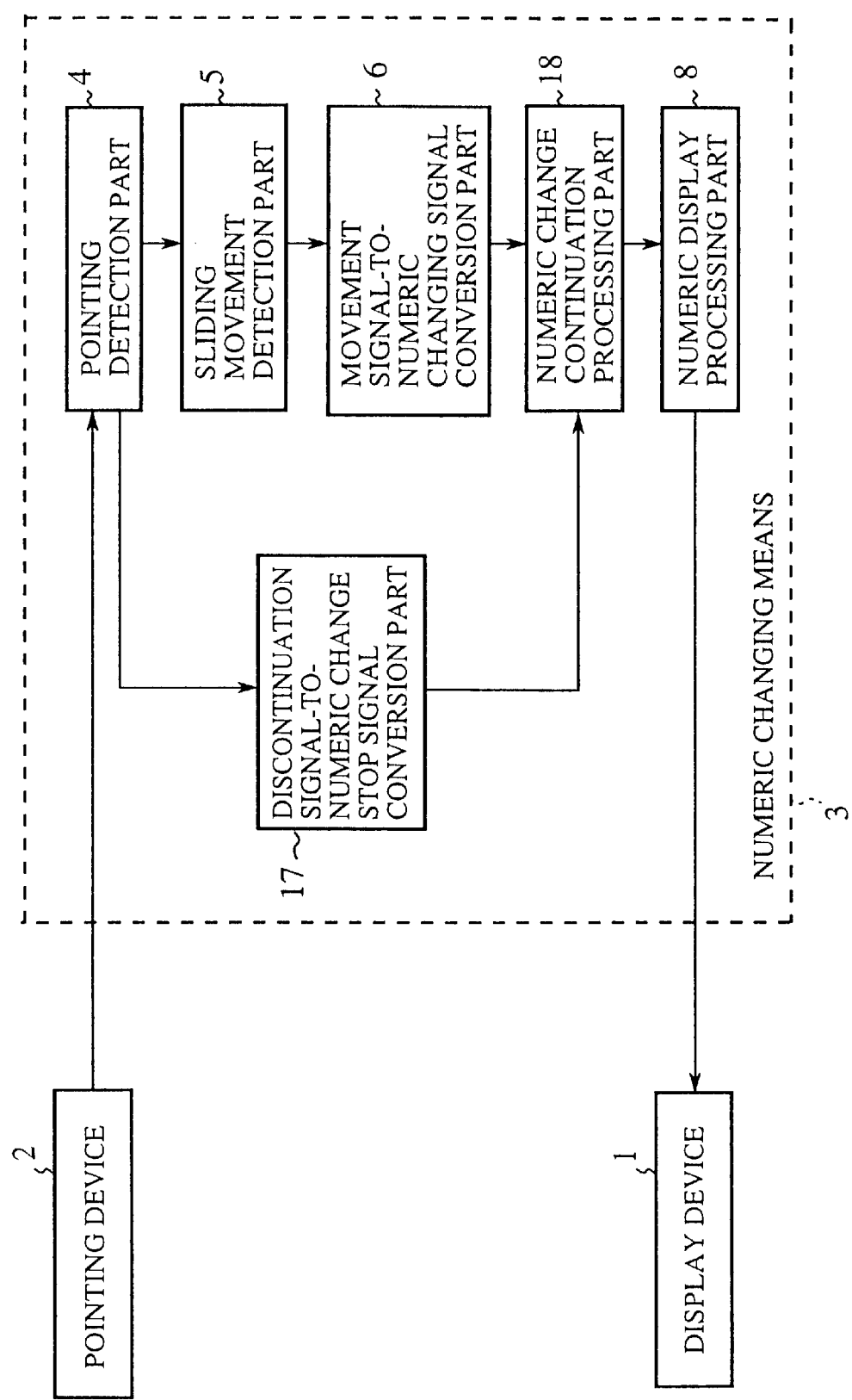

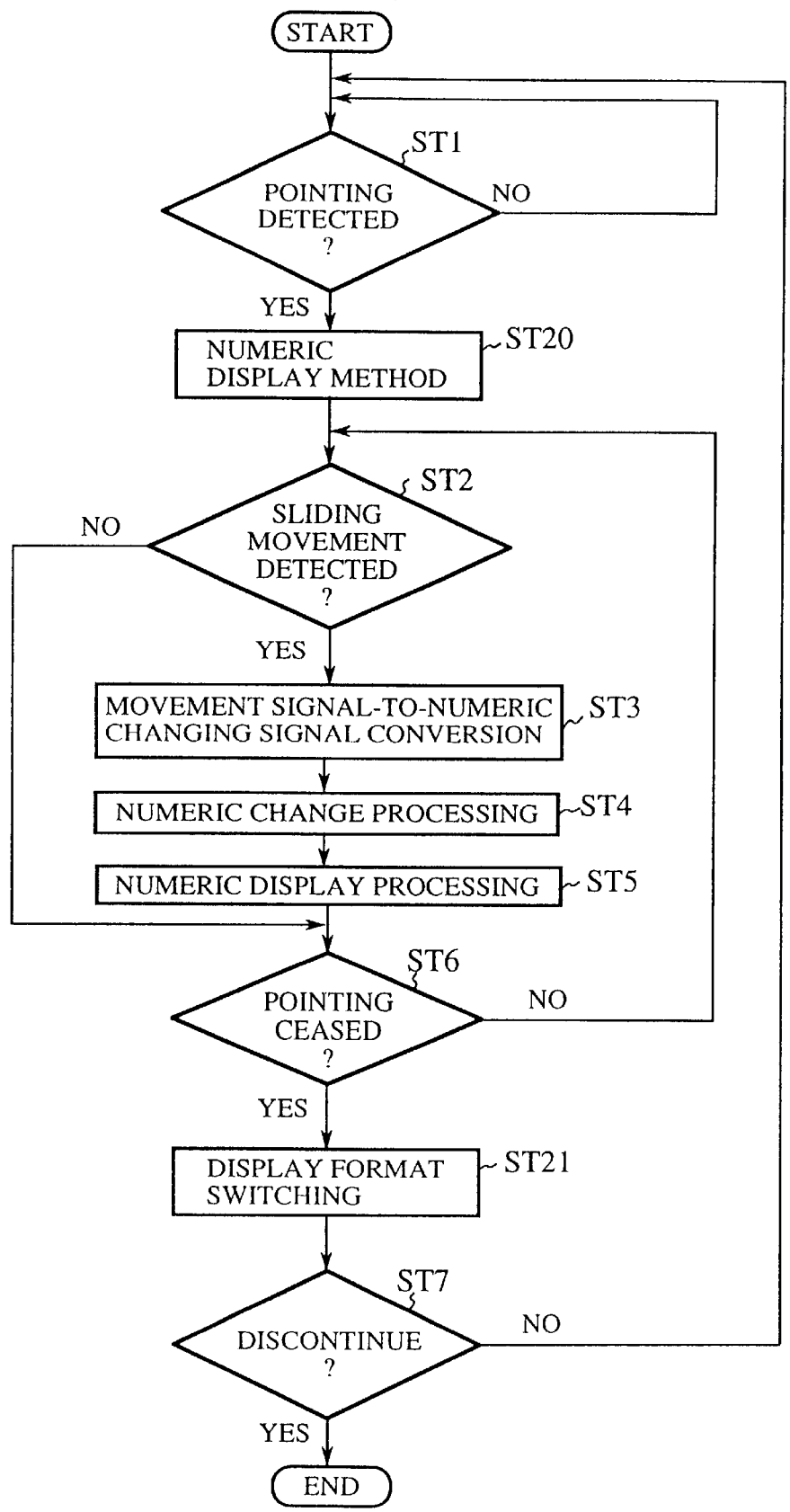

MAXIMUM VALUE 10.0

FIG.25
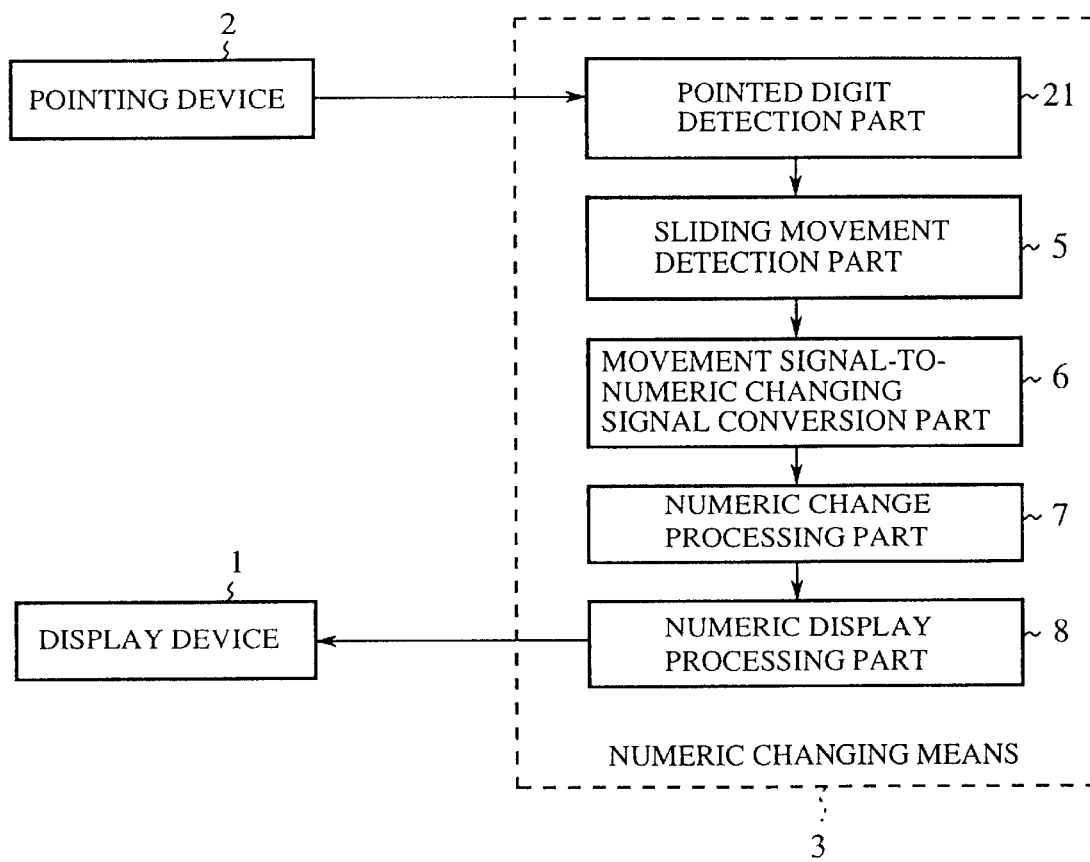
FIG.27A
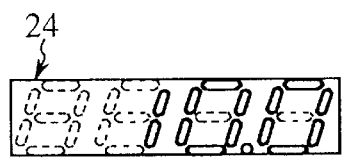
FIG.27B
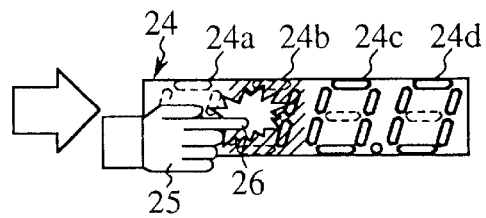
FIG.27C
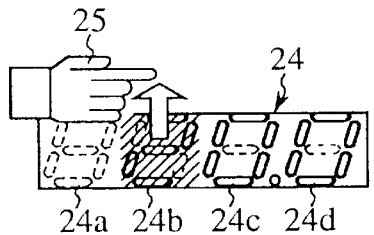
FIG.27D
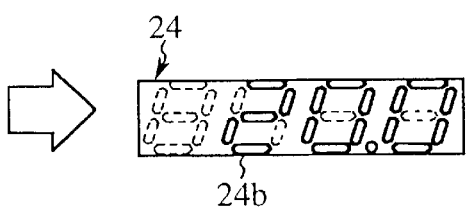
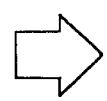

METHOD AND APPARATUS FOR CHANGING NUMERIC VALUES ON A DISPLAY DEVICE

BACKGROUND OF THE INVENTION

1. Field of the Invention

The present invention relates to a numeric value changing device and apparatus for use in industrial panel displays and personal computers. More particularly, the invention pertains to a numeric value changing method and apparatus that provide a clear and legible display of a numeric value on a small panel display device and allow ease in making a change to the numeric display without impairing its viewability.

2. Description of the Prior Art

Conventional industrial panel display devices utilize large 10-segment light emitting diodes (LEDs) to ensure that digital display of numeric parameters or the like for process control is legible from a considerable distance.

With recent improvements in liquid crystal displays (LCDs) for smaller size, higher brightness and wider angle of field, it has become possible to use small LCDs for digital display of numeric values set for process control.

With such digital display on the small LCD, the numeric value could be changed or modified using a mouse, touch panel or similar pointing means.

It is customary in the prior art, however, to display numeric changing elements, such as up and down keys and a slide bar, on the display screen of a numeric value changing device and selectively manipulate them by pointing means when to change the numeric value set on the screen.

To change the numeric value by the conventional method, it is necessary to display such display elements as the abovementioned up and down keys and slide bar on the display screen, together with the numeric value. FIGS. 34 and 35 are screen layouts showing examples of the display screen that use the above prior art method. Reference numeral 24 denotes a numeric display area provided on the display surface of a touch panel to display a numeric value of four figures (three in integral part and one decimal place); 27 denotes a slide bar displayed immediately below the numeric display area 24; and 28 denotes up and down keys displayed beside the numeric display area 24. Reference numeral 25 denotes a user's hand, and 26 a selected position pressed by the hand 25. For example, by sliding the user's finger on the slide bar 27, or by pointing the up or down key 28 with the user's finger, the numeric value displayed in the numeric display area 24 can be changed. With the conventional numeric value changing method and apparatus described above, it is necessary to provide on the display screen the display elements (the slide bar and up and down keys) 27 and 28 that are selectively used to change the displayed numeric value, together with the numeric display area 24. Hence, the space for the numeric display area 24 on the display screen is inevitably limited. Consequently, in the case of using a small LCD to provide digital display of a numeric value for use in process control, it may sometimes become impossible to provide a numeric display area large enough to make the display legible from a considerable distance.

SUMMARY OF THE INVENTION

It is therefore a general object of the present invention to provide a method and apparatus that allow ease in changing a numeric value displayed on a display device without impairing viewability. Another object of the present invention is to provide a numeric value changing method and apparatus that ensure excellent viewability from a distance even for digital display of a numeric value for process control and permit the use of pointing means to change the numeric value.

To attain the above objective, the numeric value changing method according to the present invention comprises the steps of: displaying on a display screen of display means display elements including a set value; outputting from pointing means a pointing signal containing information on the position selected by the pointing means in the display screen (which information will hereinafter be referred to as selected position information); and changing the set value with a change of the selected position information when the set value is displayed at the position corresponding to the selected position information.

With this numeric value changing method, it is possible to change the numeric value without displaying images for updating the set value. Since the conventional method necessitates displaying various display elements on the display screen for the selection by pointing means, the space for the numeric display area is inevitably limited, and the numeric value needs to be displayed small in size. However, the method of the present invention enables the numeric value to be changed by pointing means without yielding such a detriment of the prior art method.

Hence, the numeric value can be displayed large in size, for instance, over the entire area of the display surface of the display means. This allows ease in changing the numeric value by pointing means even on a small display panel without decreasing the visibility of the numeric display from a distance.

Besides, the numeric value can be changed by a single round of pointing-sliding-releasing operations, and the numeric changing process during sliding movement of the pointing means can be recognized from the numeric display being currently provided. Hence, the numeric value can easily be changed to a desired value by a simple operation.

In further accordance with the present invention, the numeric value is updated according to the distance of movement of the pointing means.

This method makes it possible to establish correspondence between the amount of manipulation of the pointing means and the amount of updating of the numeric value. Hence, the numeric value can be changed based on the operator's sensory perception.

In further accordance with the present invention, the amount of updating of the set value changes with the speed of movement of the pointing means.

Accordingly, a numeric value of many figures can also be changed efficiently in accordance with the amount of updating. Furthermore, even in the case of displaying a numeric value with many figures on a small display panel, there is no need of making provision for sensitive updating of the numeric value in response to the movement of the pointing means due to limitations on the range of movement; therefore, the numeric value can be changed easily and surely using the pointing means.

In further accordance with the present invention, the direction in which to increase or decrease the set value changes with the direction of movement of the pointing means.

With this method, it is possible to make a minute change to the set value more efficiently, for example, than in the case where the set value is changed only in one direction to increase or decrease according to the distance of movement of the pointing means. In further accordance with the present invention, the direction in which to increase or decrease the set value changes with a change in the direction of movement of the pointing means.

With this method, even if a value changed corresponding to the distance of movement of the pointing means exceeds a desired set value, it can be corrected to the desired value by bringing back the pointing means to the position corresponding thereto.

In further accordance with the present invention, the set value is changed with a change of the selected position information until the set value is deselected.

With this method, the set value need not be selected repeatedly for its change, and hence it can be changed efficiently.

In further accordance with the present invention, the set value with a plurality of digits is selectable by the pointing means for each digit.

According to this method, in the case of greatly changing the set value with many figures, too, the number of numeral candidates for each digit can be reduced, for example, to 10 (a decimal number). Hence, this embodiment provides the advantage of efficient and easy numeric change in a small panel display as well.

In further accordance with the present invention, the selected position information changes with the sliding movement of pointing means over a desired area on the display screen after pointing a desired one of the display elements by the pointing means. With this method, an operation of selecting the numeral to be changed, an operation of making the desired change, an operation of finishing the numeric change and an operation of deselecting the numeral selected are performed by a single round of pointing-sliding-releasing operations with an operator's finger. And during the sliding movement of the pointing means, too, the numeric change and the numeric display are performed at particular time intervals, and the effective area of the sliding movement of the pointing means is not limited to a specific small area.

The numeric value changing apparatus according to the present invention comprises: display means for displaying on its display screen display elements including a set value; pointing means for outputting a pointing signal that has information on the position selected by the pointing means in the display screen; and numeric changing means supplied with the pointing signal, for changing the set value with a change of the selected position information when the set value is displayed at the position corresponding to the selected position information.

With this numeric value changing apparatus, it is possible to change the numeric value without displaying images for updating the set value. Since the conventional apparatus involves displaying various display elements on the display screen for the selection by pointing means, the space for the numeric display area is inevitably limited, and the numeric value needs to be displayed small in size. However, the apparatus of the present invention enables the numeric value to be changed by pointing means without yielding such a detriment of the prior art method.

Hence, the numeric value can be displayed large in size, for instance, over the entire area of the display surface of the display means. This allows ease in changing the numeric value by pointing means even on a small display panel without decreasing the visibility of the numeric display from a distance.

Besides, the numeric value can be changed by a single round of pointing-sliding-releasing operations, and the numeric changing process during sliding movement of the pointing means can be recognized from the numeric display being currently provided. Hence, the numeric value can easily be changed to a desired value by a simple operation.

BRIEF DESCRIPTION OF THE DRAWINGS

Other objects, features and advantages of the present invention will become more apparent from the following description taken in conjunction with the accompanying drawings, in which:

FIG. 3($a$)–3($c$) is a screen layout showing an example of a display screen according to the first embodiment of the present invention;

FIG. 6($a$)–6($d$) is a screen layout showing an example of a display screen according to the second embodiment of the present invention;

FIG. 9($a$)–9($d$) is a screen layout showing an example of a display screen according to the third embodiment of the present invention;

FIG. 16 is a block diagram illustrating the configuration of a numeric value changing apparatus according to a sixth embodiment of the present invention;

FIG. 20 is a flowchart depicting the operation of numeric changing means according to the seventh embodiment of the present invention;

FIG. 25 is a block diagram illustrating the configuration of a numeric value changing apparatus according to a ninth embodiment of the present invention;

Fig. 27(a)–27(d) is a screen layout showing an example of a display screen according to the ninth embodiment of the present invention;

DETAILED DESCRIPTION OF THE PREFERRED EMBODIMENTS

A detailed description will be given, with reference to the accompanying drawings, of the preferred embodiments of the present invention.

EMBODIMENT 1

Figure 1:
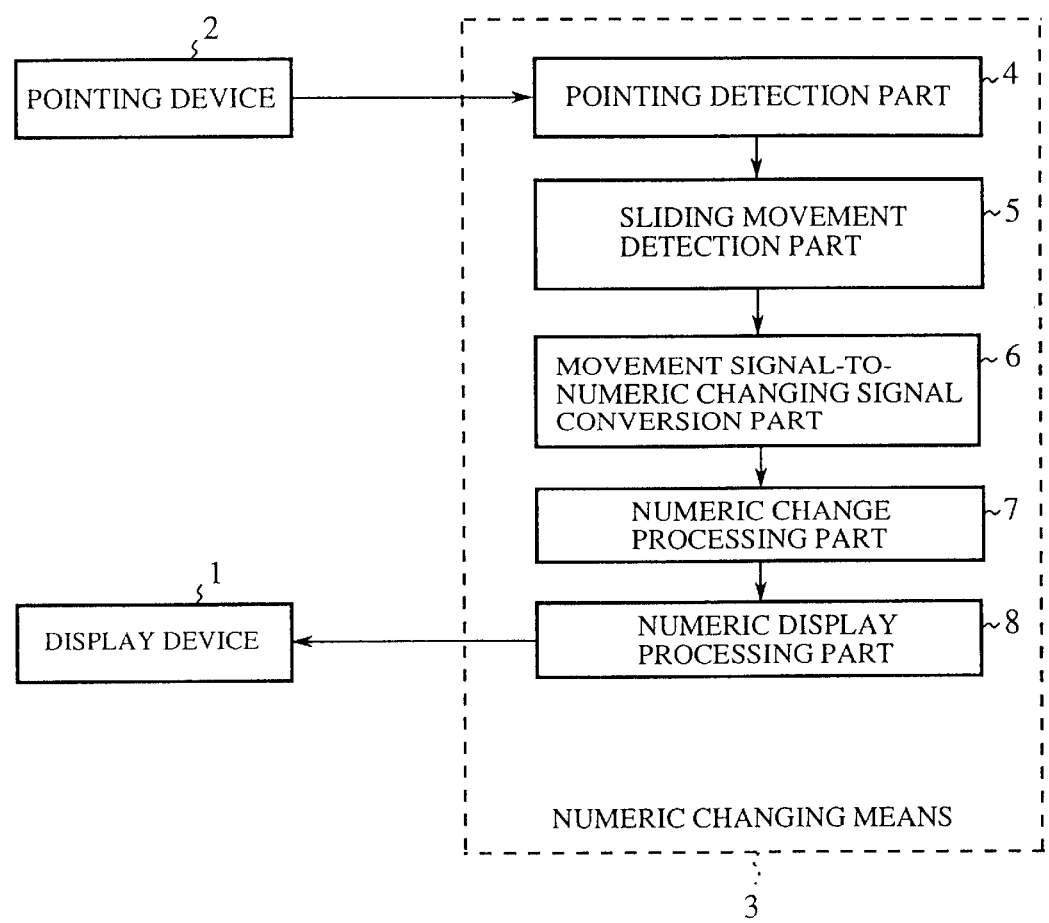
FIG. 1 is a block diagram illustrating the configuration of a numeric value changing apparatus according to a first embodiment of the present invention.

FIG. 1 is a block diagram illustrating the configuration of a numeric value changing apparatus according to a first embodiment (Embodiment 1). Reference numeral 1 denotes a display device for displaying a numeric value on its display screen; 2 denotes a pointing device for outputting a pointing signal that has information on the position selected on the display screen (which information will hereinafter be referred to as selected position information); and 3 denotes a numeric changing means for changing the numeric value in response to the pointing signal. Incidentally, a combination of the display device 1 and the pointing device 2 may be a combination of a mouse and a cathode-ray tube widely used in desktop computers, but this embodiment will be described to employ a combination of a liquid crystal display (LCD) and a touch panel. The area where to display the numeric value will hereinafter be referred to as a numeric display area 24.

Figure 2:
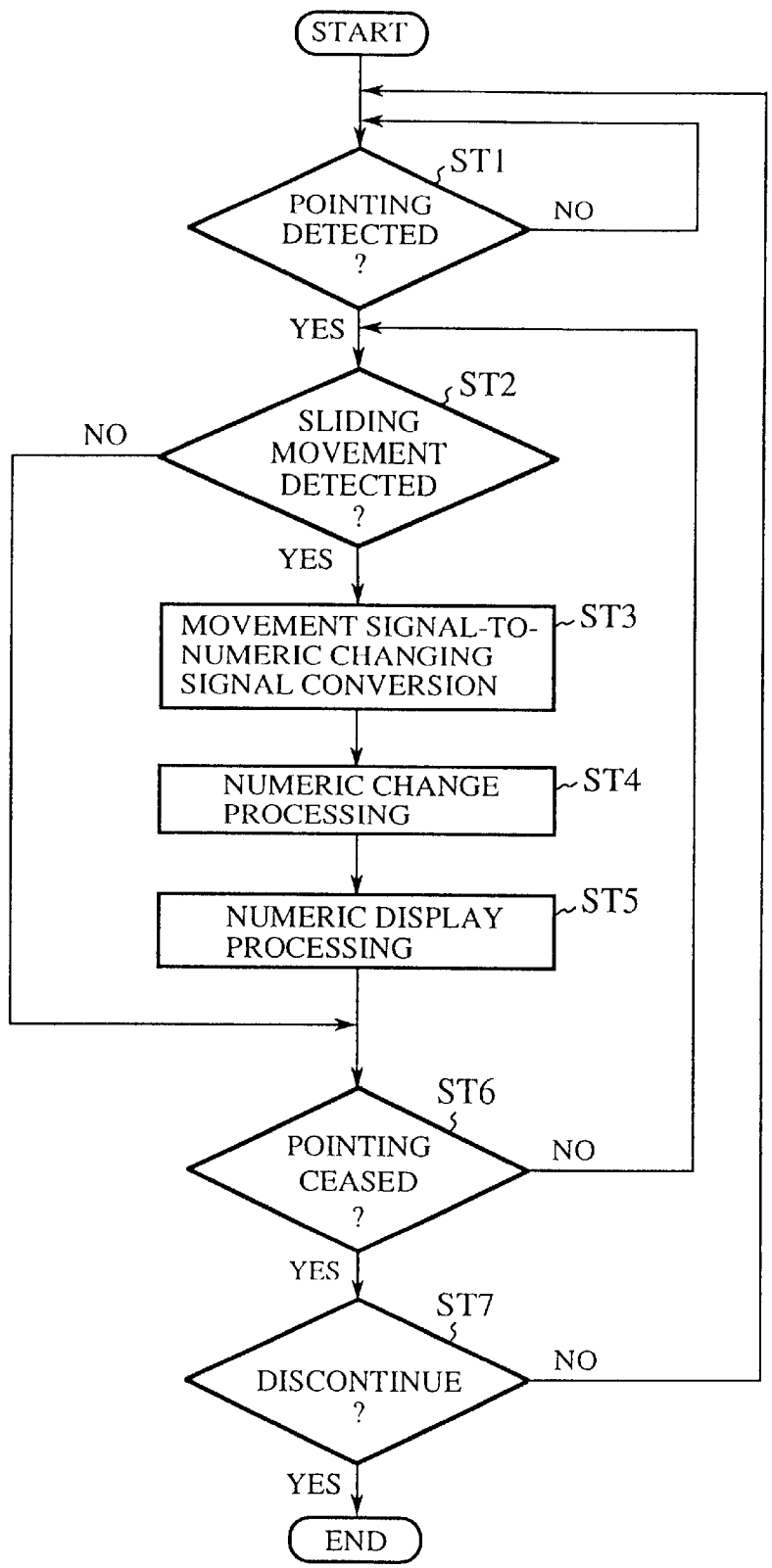
FIG. 2 is a flowchart depicting the operation of numeric changing means according to the first embodiment of the present invention.

Reference numeral 4 denotes a numeric pointer detection part which is supplied with the pointing signal from the pointing device 2 and outputs the pointing signal as a numeric value pointing signal when the position corresponding to the selected position information of the input pointing signal is in the numeric display area. Reference numeral 5 denotes a sliding movement detection part which outputs a sliding movement signal corresponding to a change of the selected position information contained in the numeric value pointing signal. Reference numeral 6 denotes a movement signal-to-numeric changing signal conversion part which calculates the amount of numeric change based on the sliding movement signal and outputs a numeric changing signal. Reference numeral 7 denotes a numeric change processing part which is supplied with the numeric changing signal and updates the numeric value based on the amount of numeric change specified by the input numeric changing signal and, at the same time, outputs a numeric signal corresponding to the updated numeric value. Reference numeral 8 denotes a numeric display processing part which supplies the display device 1 with a display signal based on the numeric signal from the numeric change processing part 7. Next, the operation of this embodiment will be described below. FIG. 2 is a flowchart showing control operations of the numeric changing means 3 according to Embodiment 1 of the present invention. In FIG. 2, ST1 is a step of making a check to determine whether the pointing detection part 4 has detected the selection of the numeric display area 24 and the entrance into a state of pointing the numeric value; ST2 is a step of making a check to determine whether the sliding movement detection part 5 has detected the sliding movement on the touch panel used as the pointing device 2; ST3 is a step of supplying the movement signalto-numeric changing signal conversion part 6 with the numeric changing signal based on the sliding movement signal available from the sliding movement detection part 5; ST4 is a step of updating the numeric value in the numeric change processing part 7 based on the specified amount of numeric change and outputting therefrom the updated numeric signal; ST5 is a step of outputting from the numeric display processing part 8 a display signal based on the updated numeric signal provided from the numeric change processing part 7; ST6 is a step of making a check to see if the pointing detection part 4 has detected the deselecting of the numeric display area 24 and repeating the processes of steps ST2 through ST5 until the display area 24 becomes deselected; and ST7 is a step of making a check to determine whether to discontinue the numeric changing procedure by the numeric changing means 3. FIG. 3 is a screen layout showing an example of the display screen according to Embodiment 1. Reference numeral 24 denotes the numeric display area 24 that is provided on the display screen of an LCD to display a numeric value with four figures (three in the integral part and one decimal place). Reference numeral 24a denotes a third digit display section, 24b a second digit display section, 24c a first digit display section, and 24d a first decimal place display section. Reference numeral 25 denotes an operator's hand manipulating the touch panel; and 26 denotes a selected position on the touch panel pressed (pointed) with a finger of the operator's hand 25.

When touched by the finger at the position corresponding to the numeric display area 24 of the display device 2, the touch panel outputs a pointing signal that has selected position information corresponding to the pointed position. And the pointing detection part 4 applies a numeric pointing signal to the sliding movement detection part 5 (FIG. 3(a)).

Then, upon sliding the finger on the touch panel upwardly, the selected position information contained in the pointing signal (a numeric pointing signal) changes correspondingly. The sliding movement detection part 5 outputs a sliding movement signal corresponding to the selected position information. The movement signal-to-numeric changing signal conversion part 6 outputs a numeric changing signal that has predetermined amount-of-numeric-change information corresponding to the input sliding movement signal, and the numeric change processing part 7 changes the preset numeric value according to the amount-of-change information provided thereto. At the same time, the numeric change processing part 7 outputs a numeric signal corresponding to the newly set numeric value, and the preset numeric value displayed on the display device 1 is updated accordingly (FIG. 3(b)).

When the finger is slid further upward on the touch panel, the preset value is further updated correspondingly, and the preset value displayed on the display device 2 is also further updated (FIG. 3(c)). Incidentally, the range over which to slide the finger on the touch panel is not limited specifically to the numeric display area 24. Once the preset numeric value to be changed has been determined, the numeric value can be changed until the numeric display area 24 is deselected, by sliding the finger anywhere on the touch panel regardless of whether inside or outside the numeric display area 24. Accordingly, the operation of determining the object to be changed, the operation of changing the numeric value, the operation of finishing the numeric change and the operation of deselecting the object of change are carried out by a single continuous finger pointing-sliding-releasing movement. Furthermore, the numeric value is changed and displayed at specific time intervals during the finger sliding movement, and the effective area for finger sliding movement is not limited to any particular small area.

The numeric value changing method according to this embodiment will be described in concrete terms. Now, let it assumed, for example, that when a numeric value "103" is currently displayed in the numeric display area 24. The numeric value on display can be changed to a desired value, for example, "121" by pressing the numeric display area 24 with the operator's finger and then sliding thereon the finger so that the preset value changes in a sequential order 103→104→105→. . . →119→120→121. Incidentally, when the predetermined number of digits to be displayed is four as in the case of FIG. 3, the range over which numeric values can be set is from 0 to 999.9. By performing processing which, when the finger is slid in excess of the maximum set value, returns it to the minimum value in such an order as 9999→0→1→2, the numeric value can freely be changed to four-digit integers larger than 0 only by monotonously increasing the numeric value.

Incidentally, the preset value to be changed is not limited specifically to those that can be changed by monotonously increasing and decreasing them, but may also be a sequence of pre-arrayed numeric values. By pre-arraying numeric values, for example, 1→3→4→6→8→10→12→1→3→4→6→8→10→12→. . . , it is possible to efficiently set and change channel numbers of commercial TV broadcasting stations in and around Tokyo, for instance.

As described above, according to Embodiment 1; the display device 1 displays a set numeric value on its display screen; the pointing device 2 outputs a pointing signal that has information on the position selected on the display screen; and the numeric changing means 3, which is supplied with the pointing signal, changes the set value in accordance with a change in the selected position information after the numeric display area 24 is selected. Hence, the preset value can be changed without displaying on the display screen any display elements for updating the preset value. With the conventional numeric value changing method and apparatus, because of the necessity for displaying on the display screen various display elements to be selected by the pointing device 2, the space for the numeric display area 24 is limited, and consequently, a numeric value needs to be displayed small in size. With the method and apparatus of the present invention, however, it is possible to change the numeric value by the pointing device 2 without causing such a disadvantage of the prior art.

Accordingly, a desired numeric value can be displayed large in size over the entire area of the display screen of the display device 1, and even in the case of using a small panel display device, the set value can easily be changed using the pointing device 2 without impairing its legibility from a distance.

In addition, the set value can be changed by a single round of finger pointing-sliding-release operations, and the numeric change processing during the pointer sliding movement can be recognized from the numeric display; hence, a change to a desired value can readily be made by simple manipulations.

EMBODIMENT 2

Figure 4:
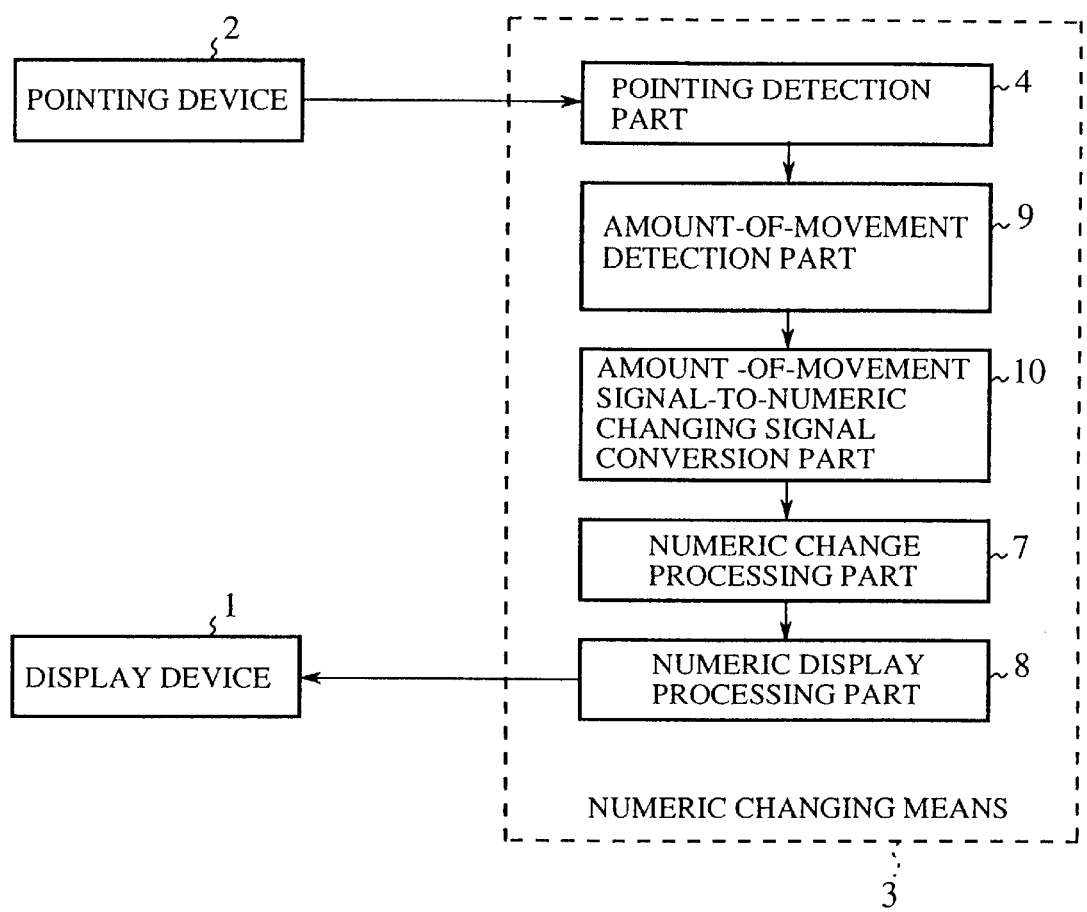
FIG. 4 is a block diagram illustrating the configuration of a numeric value changing apparatus according to a second embodiment of the present invention.

FIG. 4 is a block diagram illustrating the configuration of a numeric value changing apparatus according to a second embodiment (Embodiment 2). Reference numeral 9 denotes an amount-of-movement detection part that outputs an amount-of-movement signal corresponding to the amount of change (the amount of movement) of the selected position information contained in the pointing signal. Reference numeral 10 denotes an amount-of-movement signal-to-numeric changing signal conversion part which is supplied with the amount-of-movement signal from the detection part 9, calculates the amount of change of the numeric value from the amount of change of the selected position information and outputs a numeric changing signal accordingly. This embodiment is identical in construction with Embodiment 1 except the above. The corresponding parts are identified by the same reference numerals, and no description will be repeated.

Figure 5:
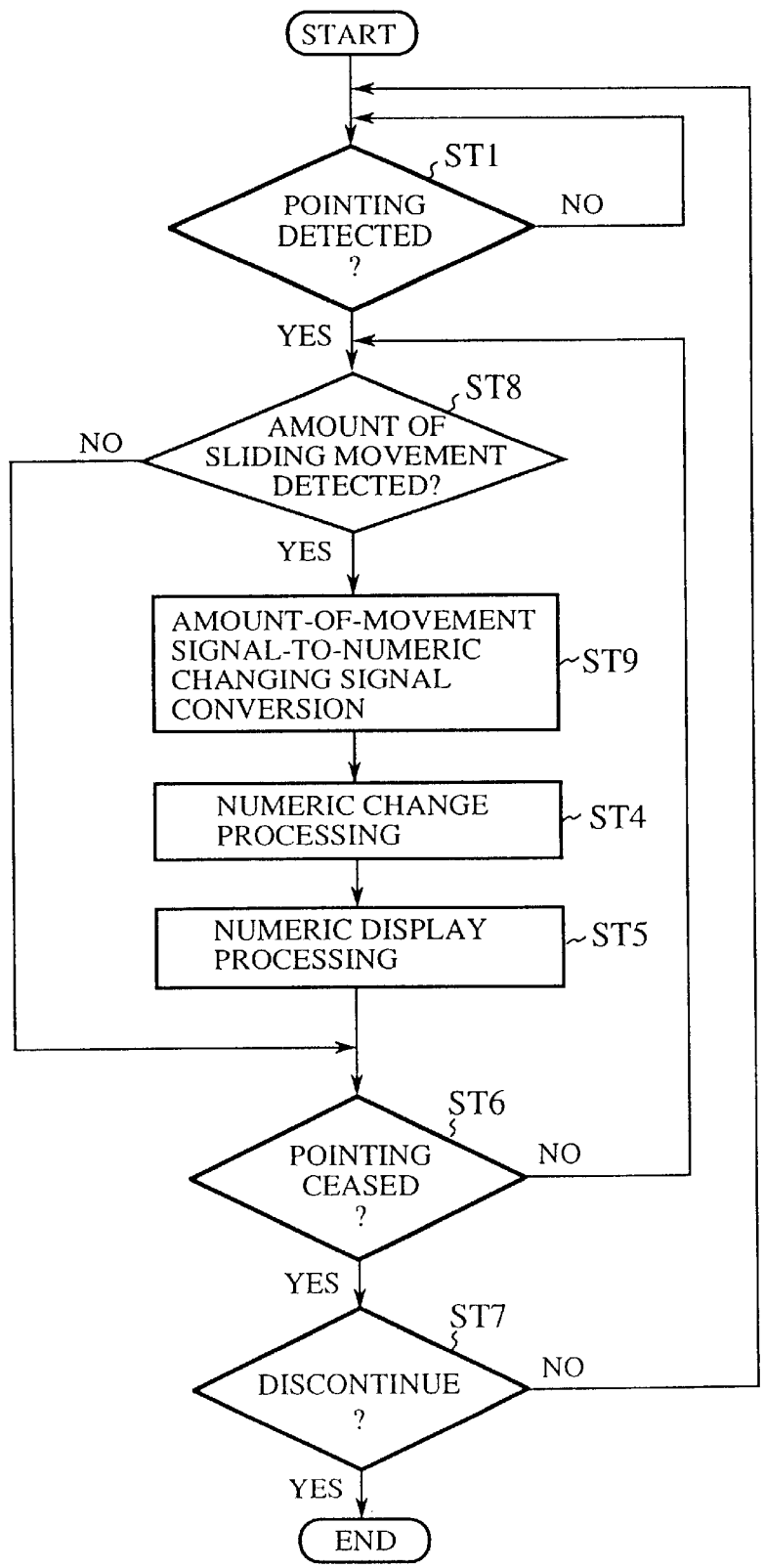
FIG. 5 is a flowchart depicting the operation of numeric changing means according to the second embodiment of the present invention.

Next, the operation of this embodiment will be described below. FIG. 5 is a flowchart showing operations of the numeric changing means 3 in this embodiment. In FIG. 5, ST8 is a step of outputting from the amount-of-movement detection part 9 the amount-of movement signal corresponding to the amount of change of the selected position information, and ST9 is a step of outputting from the amount-of-movement signal-to-numeric changing signal conversion part 10 the numeric changing signal based on the amount-of-movement signal. The other steps are the same as those in Embodiment 1, and are identified by the same reference numerals; no description will be given of them.

When touched by the finger at the position corresponding to the numeric display area 24 of the display device 2, the touch panel outputs a pointing signal that has selected position information corresponding to the pressed position.

And the pointing detection part 4 applies a numeric pointing signal to the amount-of-movement detection part 5 (FIG. 3(a)). Then, upon sliding the finger on the touch panel a little upwardly, the selected position information contained in the pointing signal (a numeric pointing signal) changes correspondingly. The amount-of-movement detection part 5 outputs an amount-of-movement signal corresponding to the amount of change in the selected position information. The amount-of-movement signal-to-numeric changing signal conversion part 10 outputs a numeric changing signal that has predetermined amount-of-numeric-change information corresponding to the input amount-of-movement signal, and the numeric change processing part 7 changes the preset numeric value according to the amount-of-change information provided thereto. At the same time, the numeric change processing part 7 outputs a numeric signal corresponding to the newly set numeric value, and the preset numeric value displayed on the display device 1 is updated accordingly (FIG. 5(b)). When the amount of sliding movement of the finger is large, the numeric changing signal becomes large correspondingly, and the set value is also greatly updated (FIGS. 5(c), (d)). For example, when the current set value is "1, " it can be changed little by little in order 1→2→3→ ... by sliding the finger on the touch panel inch by inch. When it is desired to change the set value greatly, for example, from "1" to "100," it can be done by increasing the amount of sliding movement of the finger. As described above, according to Embodiment 2, since the set value is updated in accordance with the distance of movement of the operator's finger, the amount of manipulation of the pointing device 2 can be made to correspond with the amount of updating the numeric value. This provides an advantage that the numeric value can be changed based on the operator's sensory perception.

EMBODIMENT 3

Figure 7:
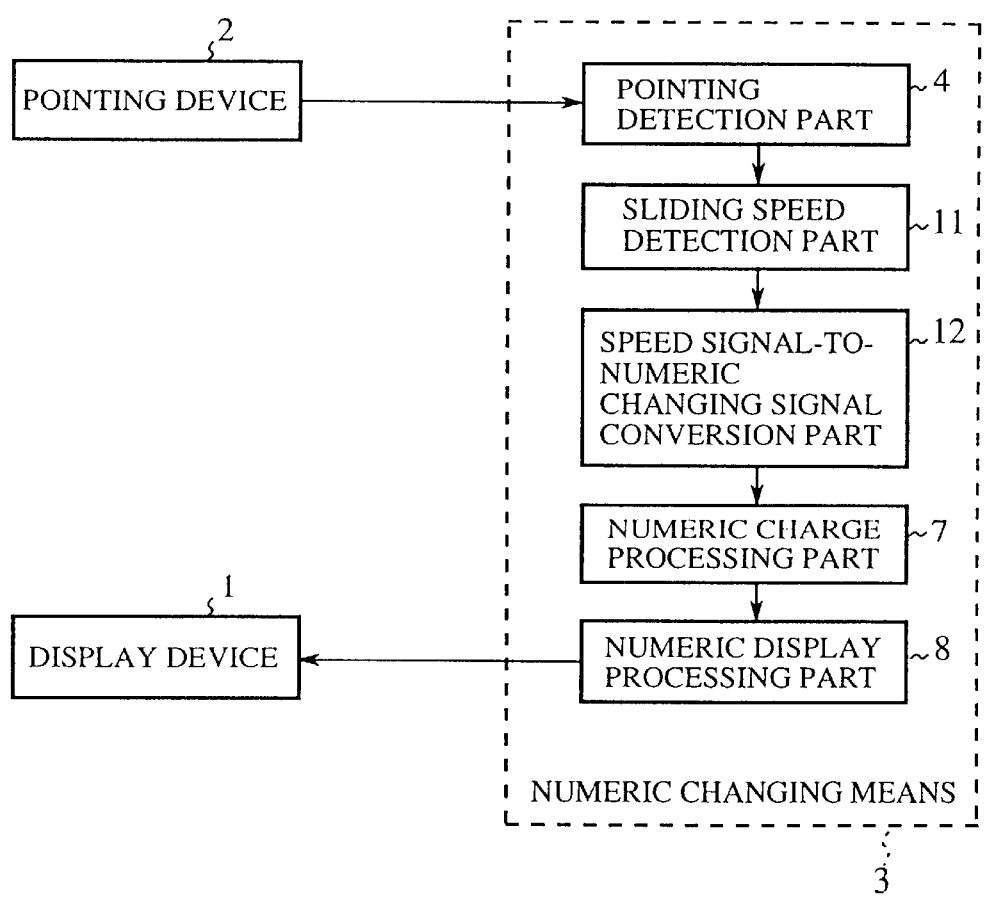
FIG. 7 is a block diagram illustrating the configuration of a numeric value changing apparatus according to a third embodiment of the present invention.

FIG. 7 is a block diagram illustrating the configuration of a numeric value changing apparatus according to a third embodiment (Embodiment 3). Reference numeral 11 denotes a sliding speed detection part that outputs a sliding speed signal corresponding to the speed of change of the selected position information contained in the pointing signal. Reference numeral 12 denotes a speed signal-to-numeric changing signal conversion part which is supplied with the sliding speed signal from the sliding speed detection part 9, then calculates the amount of change of the numeric value from the speed of change of the selected position information, and outputs a numeric changing signal accordingly. This embodiment is identical in construction with Embodiment 1 except the above. The parts corresponding to those in Embodiment 1 are identified by the same reference numerals, and no description will be repeated.

Figure 8:
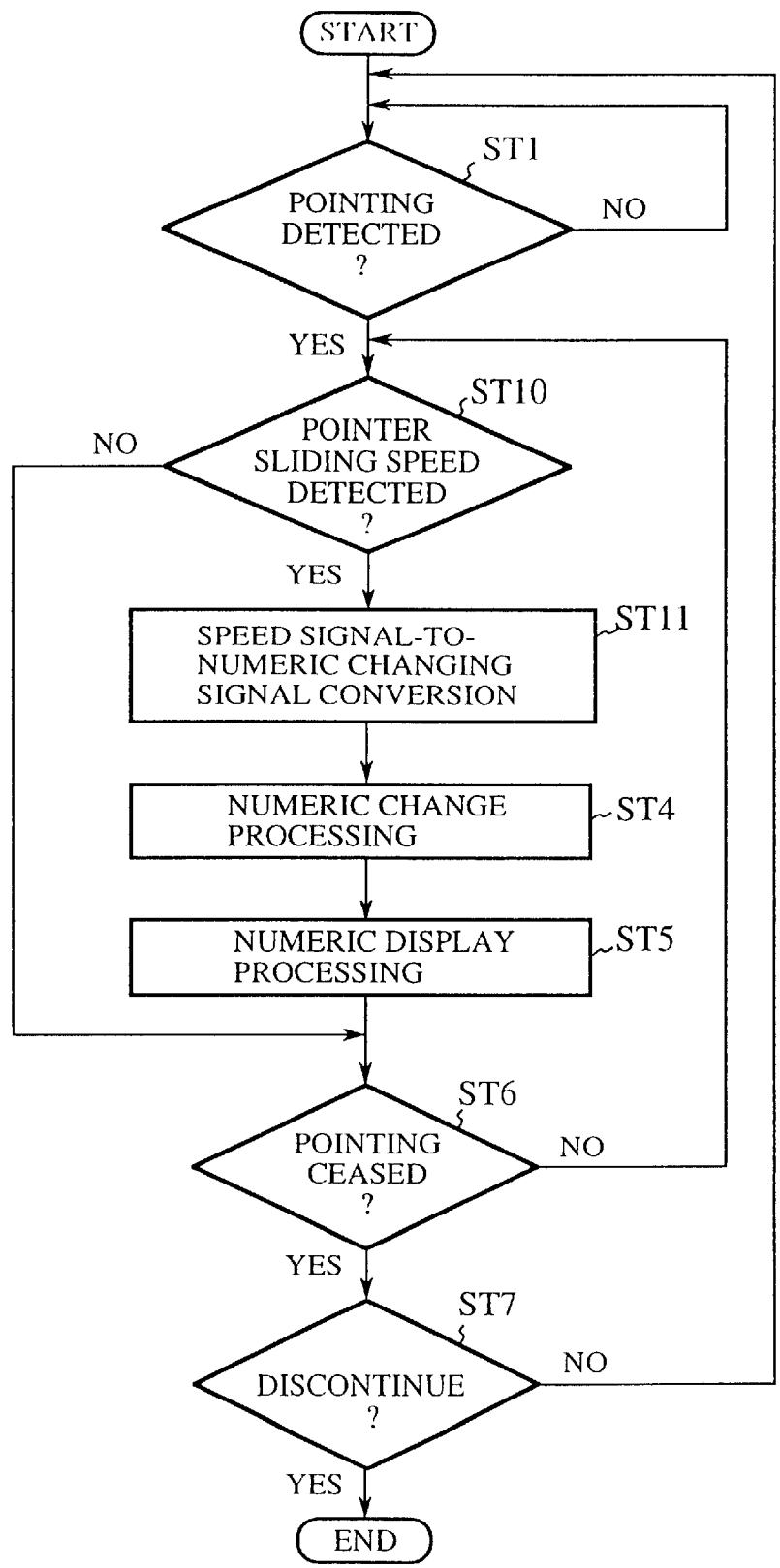
FIG. 8 is a flowchart depicting the operation of numeric changing means according to the third embodiment of the present invention.

Next, the operation of this embodiment will be described below. FIG. 8 is a flowchart showing operations of the numeric changing means 3 in this embodiment. In FIG. 8, ST10 is a step of outputting from the sliding speed detection part 11 the sliding speed signal corresponding to the speed of change of the selected position information, and ST11 is a step of outputting from the sliding speed signal-to-numeric changing signal conversion part 12 the numeric changing signal based on the sliding speed signal. The other steps are identical with those in Embodiment 1, and are identified by the same reference numerals, but no description will be given of them. FIG. 9 is a screen layout depicting an example of the display screen according to Embodiment 3. The display elements shown in FIG. 9 are identical with those in Embodiment 1, and are identified by the same reference numerals, but no description will be repeated.

When touched by the finger at the position corresponding to the numeric display area 24 of the display device 2, the touch panel outputs a pointing signal that has selected position information corresponding to the pressed position. And the pointing detection part 4 applies a numeric pointing signal to the sliding speed detection part 5 (FIG. 9(a)). Then, upon sliding the finger on the touch panel a little upwardly, the selected position information contained in the pointing signal (the numeric pointing signal) changes correspondingly. The sliding speed detection part 11 outputs a sliding speed signal corresponding to the speed of change of the selected position information. The sliding speed signal-to-numeric changing signal conversion part 12 outputs a numeric changing signal that has predetermined amount-of-numeric-change information corresponding to the input sliding speed signal, and the numeric change processing part 7 changes the preset numeric value according to the amount-of-change information provided thereto. At the same time, the numeric change processing part 7 outputs a numeric signal corresponding to the newly set numeric value, and the preset numeric value displayed on the display device 1 is also updated accordingly (FIG. 9(b)). When the finger is slid fast, the numeric changing signal becomes large correspondingly, and the set value is also greatly updated (FIGS. 9(c), (d)). For example, when the current set value is "1," it can be changed little by little in order 1→2→3→ ... by sliding the finger slowly on the touch panel over a fixed distance. When it is desired to change the set value greatly, for example, from "1" to "100," it can be achieved by sliding the finger faster over the fixed distance.

As described above, according to Embodiment 3, since the set value is updated in accordance with the speed of change of the numeric updating information, the amount of manipulation of the pointing device 2 can be made to correspond with the amount of updating the numeric value. This provides an advantage that the numeric value can be changed based on the operator's sensory perception. Furthermore, even in the case of displaying a numeric value of many figures on a small display panel, this embodiment avoids the necessity of making provision for sensitive updating of the numeric value in response to the movement of the finger due to limitations on the range of its sliding movement; hence, the numeric value can be changed easily and surely using the touch panel.

EMBODIMENT 4

Figure 10:
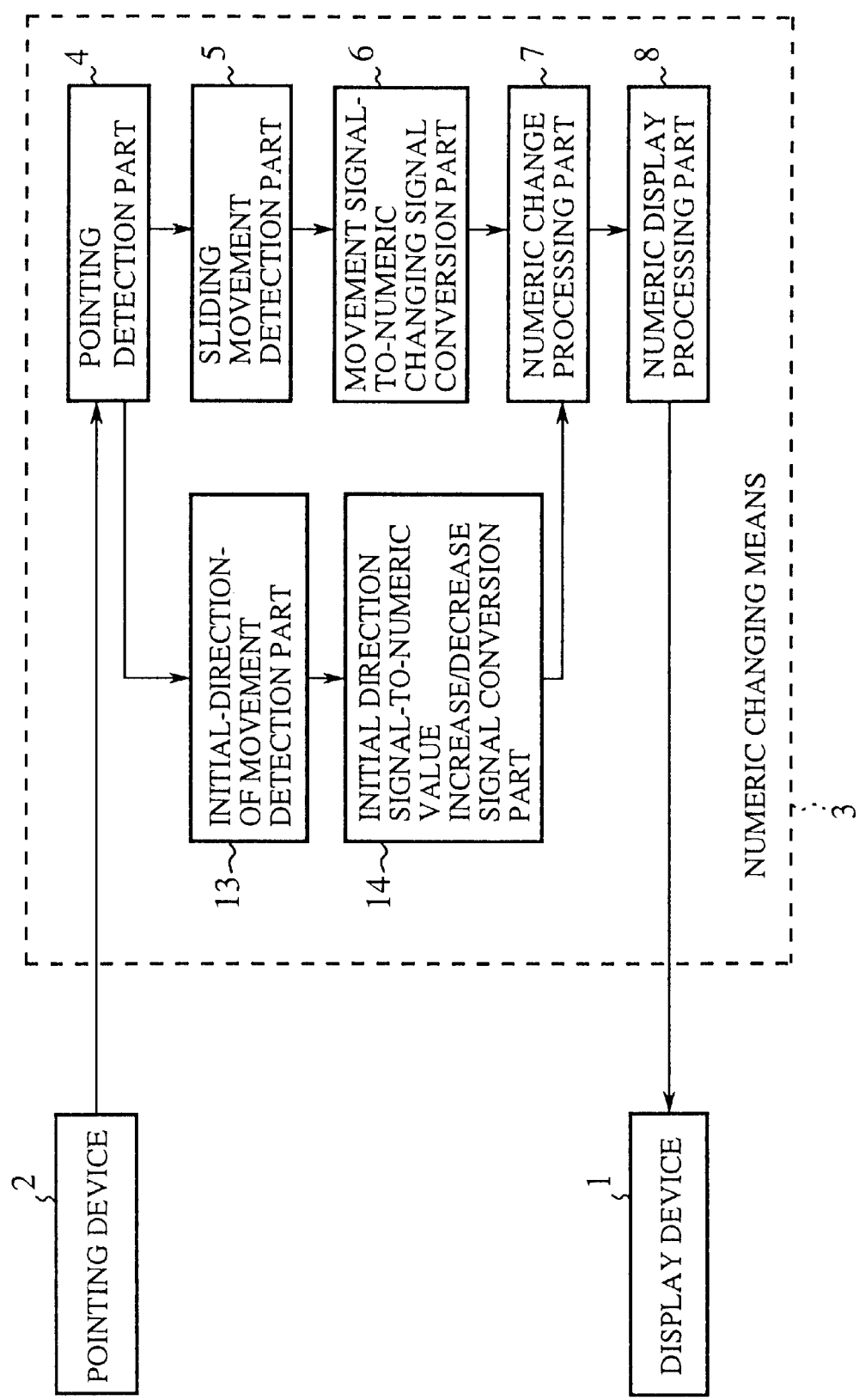
FIG. 10 is a block diagram illustrating the configuration of a numeric value changing apparatus according to a fourth embodiment of the present invention.

FIG. 10 is a block diagram illustrating the configuration of a numeric value changing apparatus according to a fourth embodiment (Embodiment 4). Reference numeral 13 denotes an initial-direction- of-movement detection part that detects the initial direction of movement of the finger on the touch panel, indicated by the numeric pointing signal, and outputs an initial-direction-of-movement signal. Reference numeral 14 denotes an initial direction signal-to-numeric value increase/decrease signal conversion part which outputs a numeric value increase/decrease signal corresponding to the initial direction of movement signal. The numeric change processing part 7 is supplied with both of the numeric changing signal and the numeric value increase/decrease signal, then increases or decreases the preset value in accordance with the numeric value increase/decrease signal, and outputs a numeric signal corresponding to the thus updated numeric value. This embodiment is identical in construction with Embodiment 1 except the above. The parts corresponding to those in Embodiment 1 are identified by the same reference numerals, and no description will be repeated.

Figure 11:
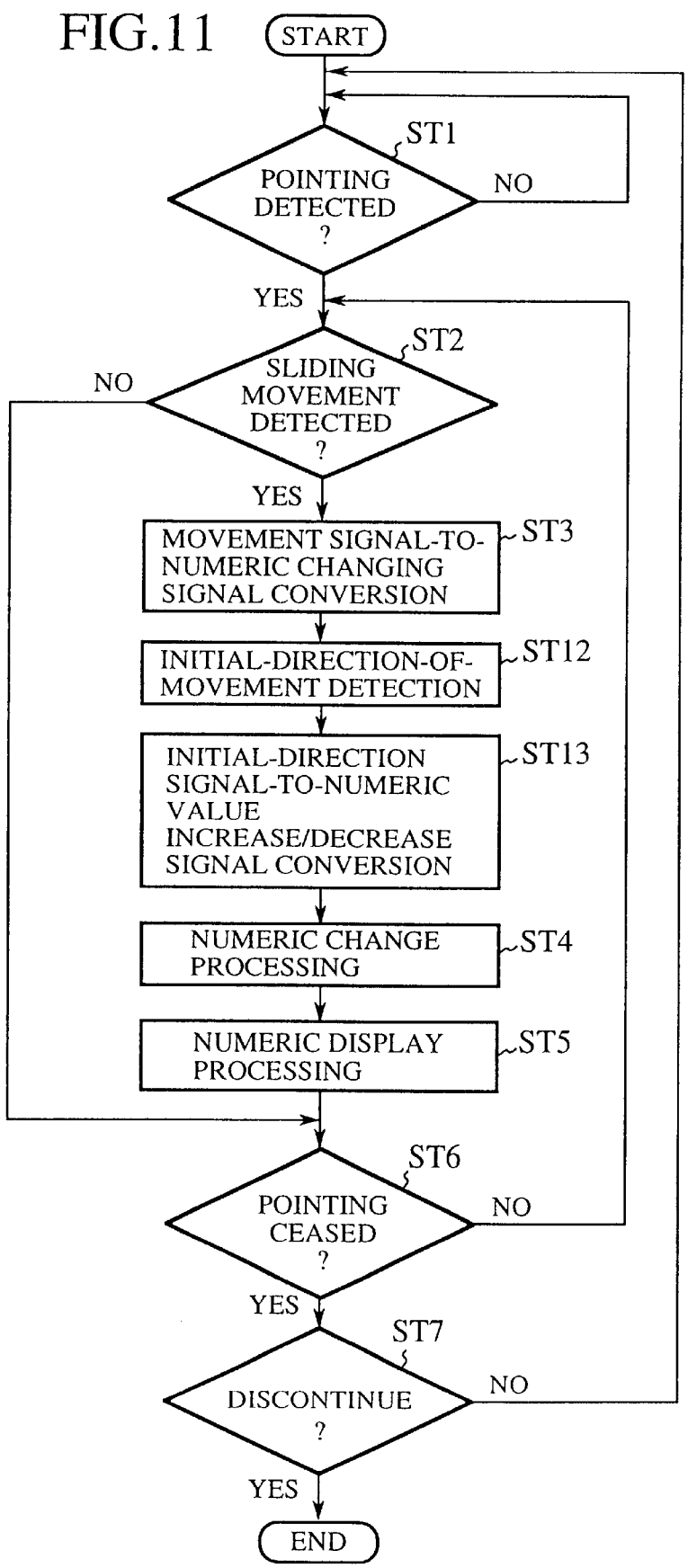
FIG. 11 is a flowchart depicting the operation of numeric changing means according to the fourth embodiment of the present invention.
Figure 12A:
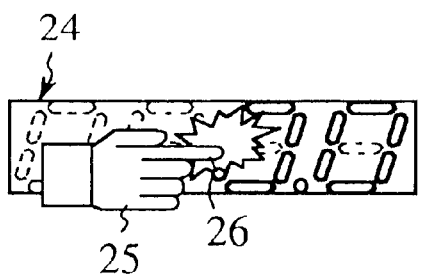
FIG. 12($a$)–12($f$) is a screen layout showing an example of a display screen according to the fourth embodiment of the present invention.
Figure 12B:
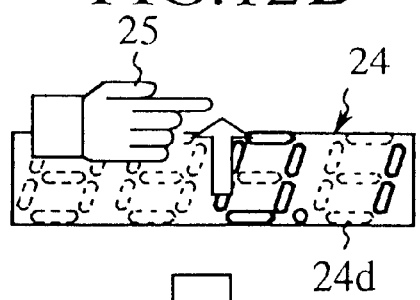
Figure 12C:
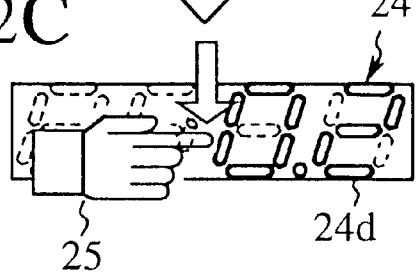
Figure 12D:
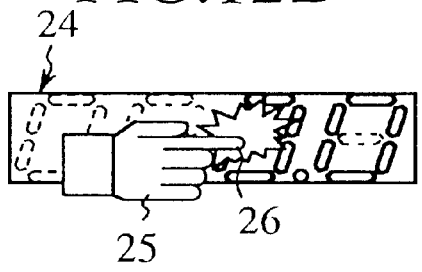
Figure 12E:
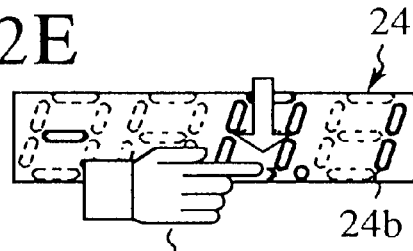
Figure 12F:
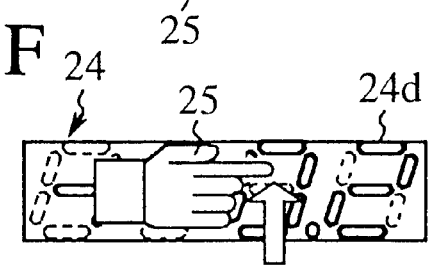

Next, the operation of this embodiment will be described below. FIG. 11 is a flowchart showing operations of the numeric changing means 3 in this embodiment. In FIG. 11, ST12 is a step of detecting the initial direction of movement of the finger on the touch panel (indicated by the numeric pointing signal) in the initial-direction-of-movement detection part 13, and ST13 is a step of outputting from the initial direction signal-to-numeric value increase/decrease signal conversion part 14 the numeric value increase/decrease signal based on the initial-direction-of movement signal. The other steps are identical with those in Embodiment 1, and are identified by the same reference numerals, but no description will be given of them.

FIG. 12 is a screen layout depicting an example of the display screen according to Embodiment 4. The display elements shown in FIG. 12 are identical with those in Embodiment 1, and are identified by the same reference numerals, but no description will be repeated. Upon sliding the finger upward on the touch panel in an area corresponding to the numeric display area 24 of the display device 1, the initial-direction-of-movement detection part 13 detects the direction of movement of the finger, and outputs the initial-direction-of-movement signal. And the initial direction signal-to-numeric value increase/decrease signal conversion part 14 outputs a numeric value increase/decrease signal of a positive direction. At the same time, the sliding movement detection part 5 and the movement signal-to-numeric changing signal conversion part 6 provide a numeric changing signal corresponding to the amount of subsequent movement of the finger. And the numeric change processing part 7 changes the set value in the direction of increase in accordance with the amount-of-numeric-change information and the numeric value increase/decrease signal (FIGS. 12(*a*) to (*c*)). Contrary to the above, upon sliding the finger downward on the touch panel, the numeric change processing part 7 changes the set value in the direction of decrease in accordance with the amount-of-numeric-change information and the numeric value increase/decrease signal (FIGS. 12(*d*) to (*f*)). While in this embodiment the numeric value has been described to be increased or decreased depending on whether the finger is initially slid upward or downward on the touch panel, the correspondence between the initial direction of movement of the finger and the direction of change of the numeric value is not limited specifically to the above. The numeric value may be increased or decreased, for example, depending on whether the finger is initially slid to right or left. In the case of greatly changing a numeric value displayed at the upper right portion of the display screen, the operation of increasing the set value can be continued by sliding the finger upward to the upper edge of the screen first and then to left or downward. The other operations are the same as in Embodiment 1, and no description will be given of them.

As described above, according to Embodiment 4, since the direction of increasing or decreasing the set value is dependent on the initial direction of change of the numeric value updating information, the numeric value increasing or decreasing operation can be continued even if the direction of movement of the finger is changed. This permits minute setting with higher efficiency than in the case where the set value is only increased or decreased merely corresponding to a change in the distance of movement of the finger. According to Embodiment 4, the direction of increasing or decreasing the set value is determined by the initial direction of movement of the finger indicated by the numeric pointing signal, and hence remains unchanged even if the direction of change of the numeric value updating information is changed afterward. Accordingly, it is possible to count an accumulated distance of reciprocating movement of the finger, for example, on a small display screen—this allows ease in changing the set value by moving the finger over a long distance on the display screen.

EMBODIMENT 5

Figure 13:
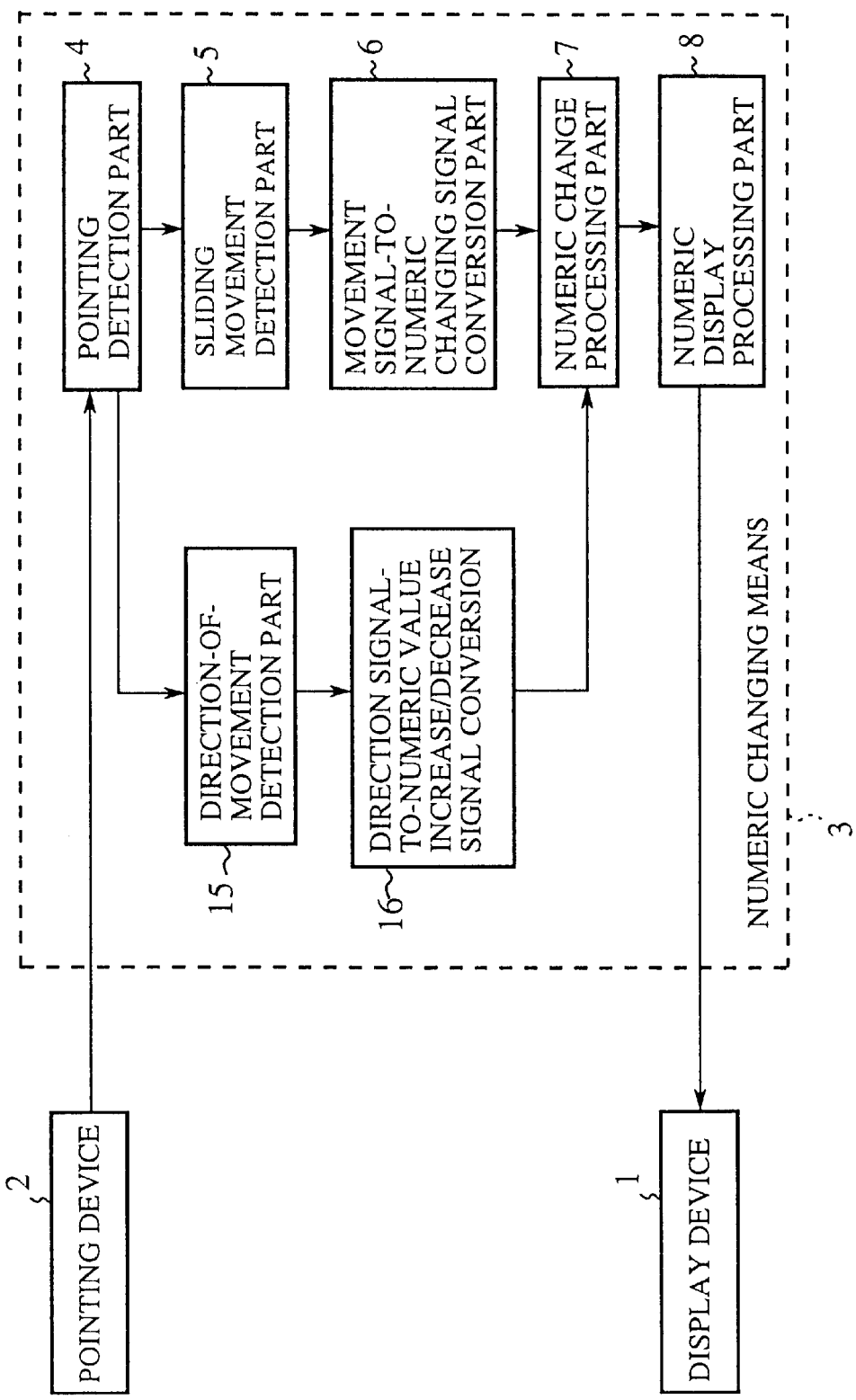
FIG. 13 is a block diagram illustrating the configuration of a numeric value changing apparatus according to a fifth embodiment of the present invention.

FIG. 13 is a block diagram illustrating the configuration of a numeric value changing apparatus according to a fifth embodiment (Embodiment 5). Reference numeral 15 denotes a direction-of-movement detection part that detects the direction of movement of the finger contained in selected position information during the input thereinto of a numeric pointing signal and outputs a direction-of-movement signal. Reference numeral 16 denotes a direction signal-to-numeric value increase/decrease signal conversion part which responds to a change of direction-of-movement information contained in the direction signal from the detection part 15 to output a different numeric value increase/decrease signal. The numeric change processing part 7 is supplied with both of the numeric changing signal and the numeric value increase/decrease signal, then changes the set value in the direction that increases or decreases it in accordance with the numeric value increase/decrease signal, and at the same time, outputs a numeric signal corresponding to the thus updated numeric value. This embodiment is identical in construction with Embodiment 1 except the above. The parts corresponding to those in Embodiment 1 are identified by the same reference numerals, and no description will be repeated.

Figure 14:
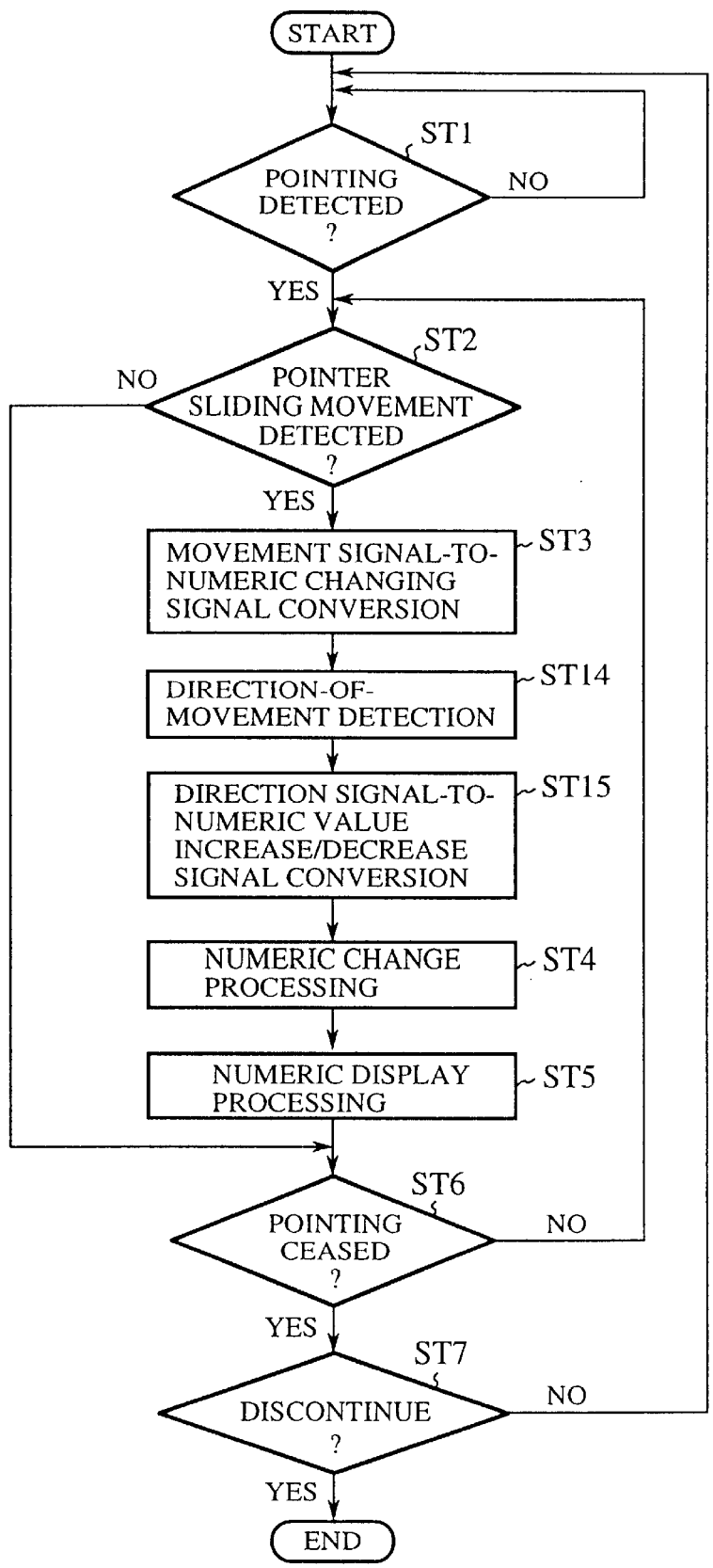
FIG. 14 is a flowchart depicting the operation of numeric changing means according to the fifth embodiment of the present invention.
Figure 15A:
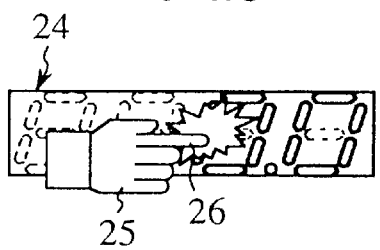
FIG. 15($a$)–15($d$) is a screen layout showing an example of a display screen according to the fifth embodiment of the present invention.
Figure 15B:
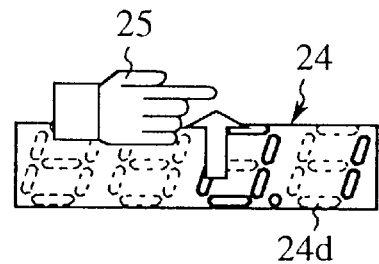
Figure 15C:
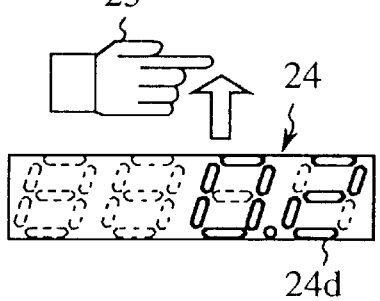
Figure 15D:
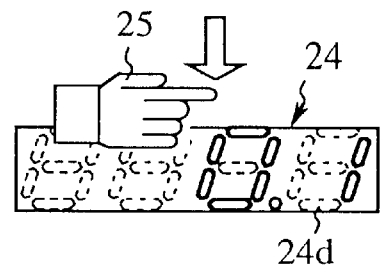
Figure 18A:
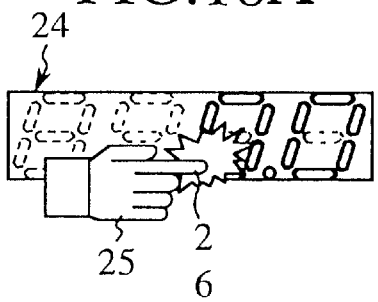
FIG. 18($a$)–18($d$) is a screen layout showing an example of a display screen according to the sixth embodiment of the present invention.
Figure 18B:
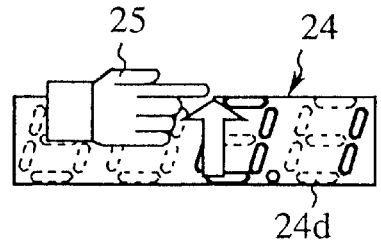
Figure 18C:
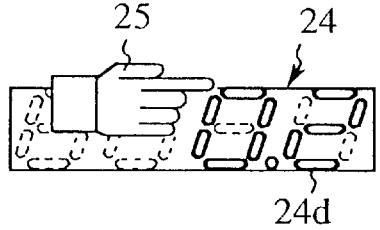
Figure 18D:
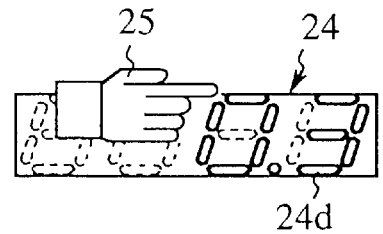

Next, the operation of this embodiment will be described below. FIG. 14 is a flowchart showing operations of the numeric changing means 3 in this embodiment. In FIG. 14, ST14 is a step of detecting the direction of movement of the finger on the touch panel (indicated by the selected position information) by the direction-of-movement detection part 15 during the input thereinto of the numeric pointing signal, and ST15 is a step of outputting from the direction signal-to-numeric value increase/decrease signal conversion part 16 the numeric value increase/decrease signal based on the direction-of-movement signal. The other steps are identical with those in Embodiment 1, and are identified by the same reference numerals, but no description will be given of them. FIG. 15 is a screen layout depicting an example of the display screen according to Embodiment 5. The display elements shown in Fig. 15 are identical with those in Embodiment 1, and are identified by the same reference numerals, but no description will be repeated. Upon sliding the finger upward on the touch panel in an area corresponding to the numeric display area 24 of the display device 1, the direction-of-movement detection part 15 detects the direction of movement of the finger, and outputs the direction-of-movement signal. And the direction signal-to-numeric value increase/decrease signal conversion part 16 outputs a numeric value increase/decrease signal of a positive direction (FIGS. 15(*a*) to (*c*)). Then, upon sliding the finger downward on the touch panel, the direction-of-movement detection part 15 provides a different direction-of-movement signal, and the signal conversion part 16 provides a numeric value increase/decrease signal of a negative direction (FIG. 15(*d*)). While in this embodiment the numeric value has been described to be increased or decreased depending on whether the finger is slid upward or downward on the touch panel, the correspondence between the direction of movement of the finger and the direction of change of the numeric value is not limited specifically to the above. The numeric value may be increased or decreased, for example, depending on whether the finger is slid to right or left. In the case of changing the current numeric value, for example, from "103" to "112," if the upward sliding movement of the finger overshoots its intended stopping position just one point, i.e. 103→104→105→ . . . →111→112→113, the direction of sliding movement needs only to be changed to the downward direction for further sliding movement, by which the value increasing operation is switched to the decreasing operation, making a 113→112 correction to the numeric value.

As described above, according to Embodiment 5, since the direction of increasing or decreasing the set value changes with a change in the direction of movement of the finger, even if the numeric value is changed to a value larger than the intended one, it is possible to correct the unintended value to the desired one simply by changing the direction of movement of the finger.

EMBODIMENT 6

FIG. 16 is a block diagram illustrating the configuration of a numeric value changing apparatus according to a sixth embodiment (Embodiment 6). Reference numeral 17 denotes a discontinuation signal-to-numeric change stop signal conversion part which is supplied with the numeric pointing signal and, upon discontinuation of the input thereto of this pointing signal, outputs a numeric change stop signal. Reference numeral 18 denotes a numeric change continuation processing part which, until the application thereinto of the numeric change stop signal, keeps on processing for updating the set value at fixed time intervals and, upon each updating, outputs a numeric signal corresponding to the updated value. This embodiment is identical in construction with Embodiment 1 except the above. The parts corresponding to those in Embodiment 1 are identified by the same reference numerals, and no description will be repeated.

Figure 17:
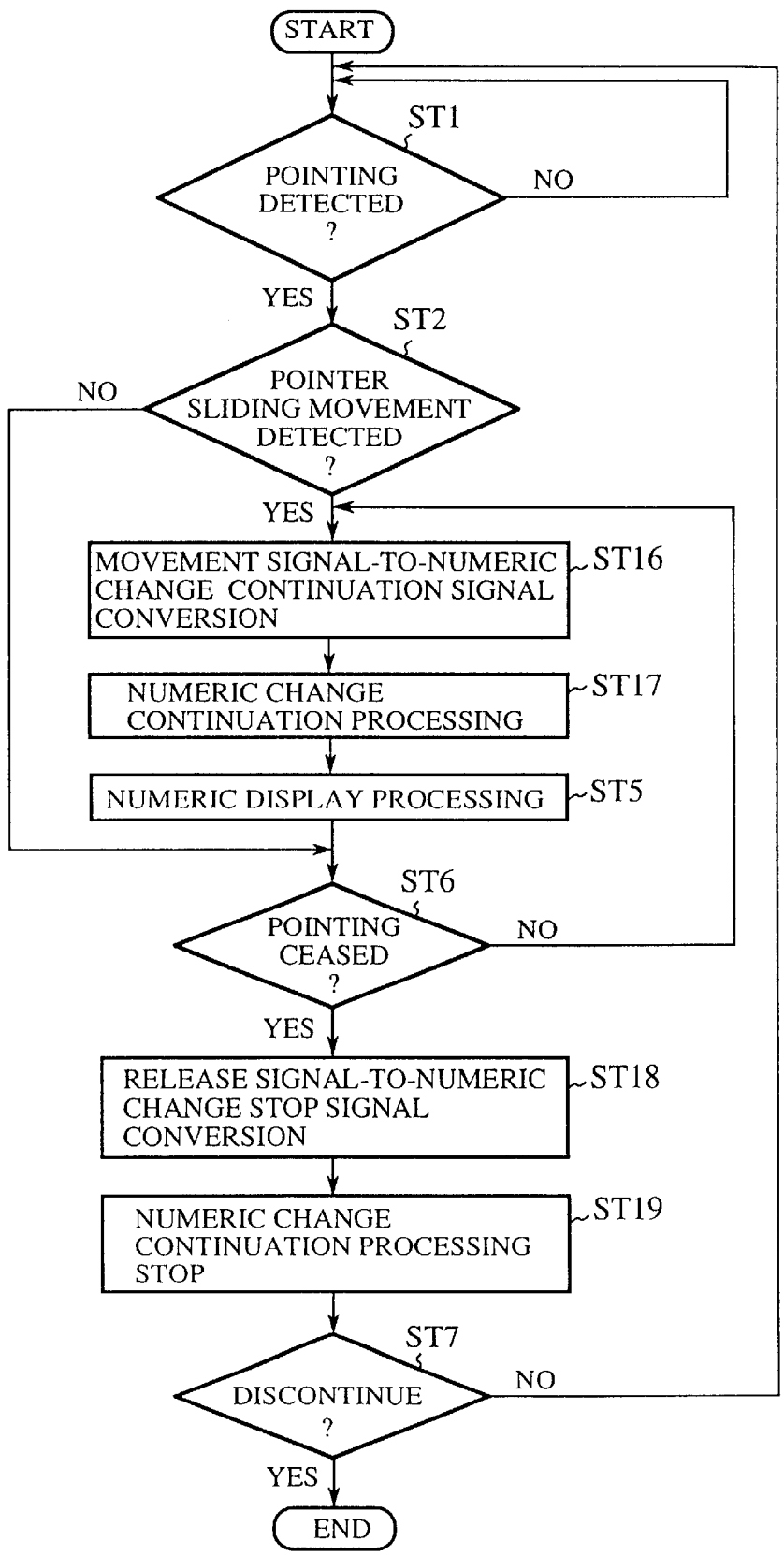
FIG. 17 is a flowchart depicting the operation of numeric changing means according to the sixth embodiment of the present invention.

Next, the operation of this embodiment will be described below. FIG. 17 is a flowchart showing operations of the numeric changing means 3 in this embodiment. In FIG. 17, ST16 is a step of outputting from the direction signal-to-numeric changing signal conversion part 6 the numeric changing signal based on the direction-of-movement signal at fixed time intervals; ST17 is a step of outputting from the numeric change continuation processing part 18 the numeric signal based on the numeric changing signal; ST18 is a step of outputting from the discontinuation signal-to-numeric change stop signal conversion part 17 the numeric change stop signal in response to the discontinuation of the input thereto of the numeric pointing signal; and ST19 is a step of stopping the numeric change continuation processing part 18 from outputting the numeric signal based on the numeric changing signal. The other steps are identical with those in Embodiment 1, and are identified by the same reference numerals, but no description will be given of them.

FIG. 18 is a screen layout depicting an example of the display screen according to Embodiment 6. The display elements shown in FIG. 18 are identical with those in Embodiment 1, and are identified by the same reference numerals, but no description will be repeated. Upon sliding the finger on the touch panel in an area corresponding to the numeric display area 24 of the display device 1 (FIG. 18(a)), a numeric changing signal indicative of a change in the position of the finger is fed into the numeric change continuation processing part 18. Until supplied with the numeric change stop signal from the discontinuation signal-to-numeric change stop signal conversion part 17, the numeric change continuation processing part 18 increases or decreases the set value at fixed time intervals and outputs a numeric signal of a different value. And the set value displayed on the display device 1 is also updated correspondingly (FIGS. 18(b) to (c)). For example, even if the sliding movement of the finger is stopped after changing the set value from "1" to "2" by the initial sliding movement, the set value can be further changed in order 2→3→4→ . . . as long as the numeric value to be changed is pointed by the finger. Then, the numeric value thus changed can finally be set at the desired value by taking the finger off the touch panel at predetermined timing (FIG. 18(d)).

As described above, according to Embodiment 6, since the numeric value changing operation is continued during the application of the pointing signal to the signal conversion part 17, there is no need of repeating the finger sliding operation and the numeric value selecting operation for changing one set value. This provides increased efficiency in the numeric value changing operation.

EMBODIMENT 7

Figure 19:
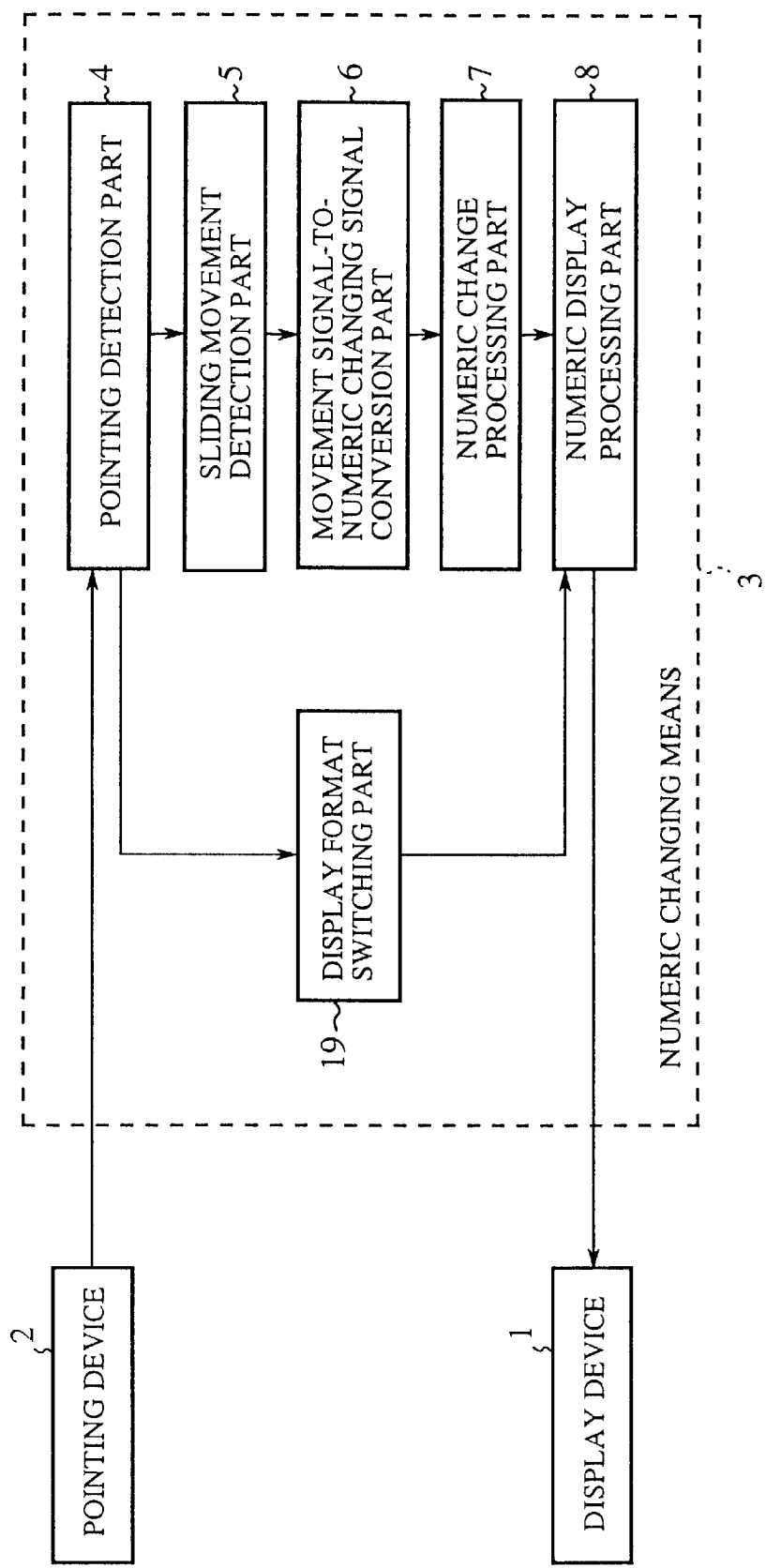
FIG. 19 is a block diagram illustrating the configuration of a numeric value changing apparatus according to a seventh embodiment of the present invention.
Figure 21A:
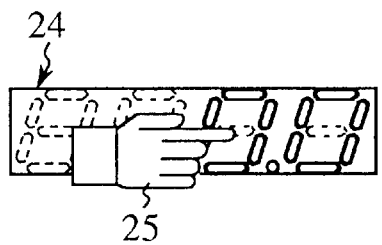
FIG. 21(a)–21(d) is a screen layout showing an example of a display screen according to the seventh embodiment of the present invention.
Figure 21B:
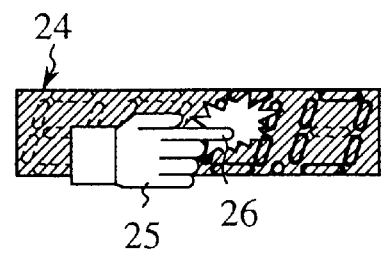
Figure 21C:
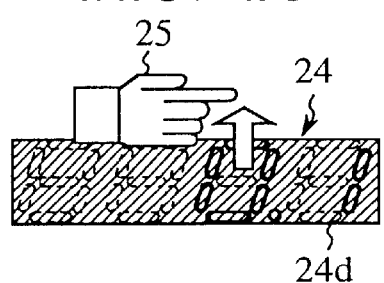
Figure 21D:
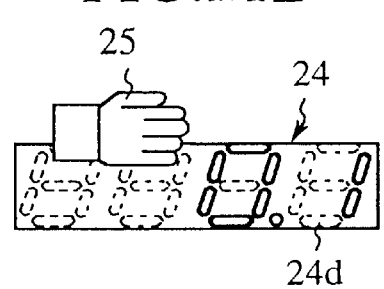

FIG. 19 is a block diagram illustrating the configuration of a numeric value changing apparatus according to a seventh embodiment (Embodiment 7). Reference numeral 19 denotes a numeric display format switching part which outputs a display format signal for changing the display format of the numeric display area 24. When supplied with the display format signal, the numeric display processing part 8 responds it to perform processing for changing the color or the like of the display area 24, and outputs a display signal accordingly. This embodiment is identical in construction with Embodiment 1 except the above. The parts corresponding to those in Embodiment 1 are identified by the same reference numerals, and no description will be repeated. Next, the operation of this embodiment will be described below. FIG. 20 is a flowchart showing operations of the numeric changing means 3 in this embodiment. In FIG. 20, ST20 is a step of outputting from the numeric display format switching part 19 the display format signal and from the numeric display processing part 8 the display signal indicating, for example, a color different from the previous one in response to the display format signal; and ST21 is a step of performing processing for restoring the previous display color or the like of the display area 24 in the display format switching part 19 and the display processing part 8 in response to the discontinuation of the pointing signal. Incidentally, what is changed based on the display format signal is not limited specifically to color. The other steps are identical with those in Embodiment 1, and are identified by the same reference numerals, but no description will be given of them.

FIG. 21 is a screen layout depicting an example of the display screen according to Embodiment 7. The display elements shown in FIG. 21 are identical with those in Embodiment 1, and are identified by the same reference numerals, but no description will be repeated. Upon pressing the finger against the touch panel in an area corresponding to the numeric display area 24 of the display device 1 (FIG. 21(a)), the display format switching part 19 provides the display format signal, and the color or the like of the display area 24 is changed (FIG. 21(a)). By stopping the generation of the pointing signal (i.e. by stopping the sliding movement of the finger) after changing the set value by sliding the finger on the touch panel (FIG. 21(c)), the display format signal from the display format switching part 19 is canceled, and the color or the like of the display area 24 is restored (FIG. 21(d)). For example, when a set value normally displayed against a black background is selected by pointing with the finger for change, the background color turns blue, and the blue background remains unchanged during the numeric changing operation by the finger sliding movement, but it turns black again when the finger is moved off the touch panel.

As described above, according to Embodiment 7, since the selected numeric value remains in the new display format until it becomes deselected, it can easily be distinguished from other set values displayed on the touch panel. For example, even if an unintended one of numerical values displayed on the touch panel is selected, it can readily be found out before it is changed. Hence, it is possible to prevent the controlled object from being controlled based on a wrong set value when the numeric value changing apparatus of this embodiment is used to change numeric parameters for process control.

EMBODIMENT 8

Figure 22:
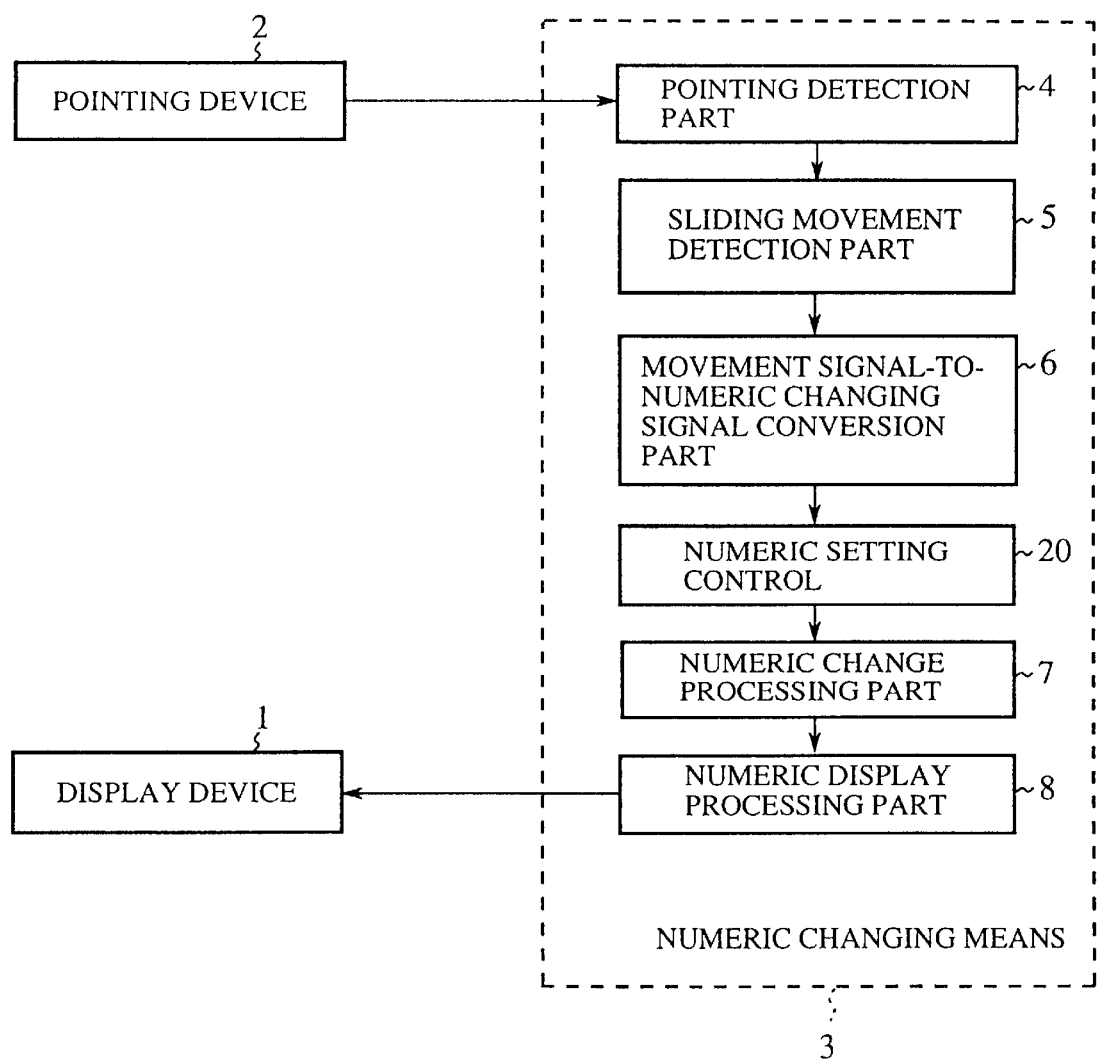
FIG. 22 is a block diagram illustrating the configuration of a numeric value changing apparatus according to an eighth embodiment of the present invention.

FIG. 22 is a block diagram illustrating the configuration of a numeric value changing apparatus according to an eighth embodiment (Embodiment 8). Reference numeral 20 denotes a numeric setting control part which controls numeric setting to stay within a range defined by certain maximum and minimum values. This embodiment is identical in construction with Embodiment 1 except the above. The parts corresponding to those in Embodiment 1 are identified by the same reference numerals, and no description will be repeated.

Figure 24A:
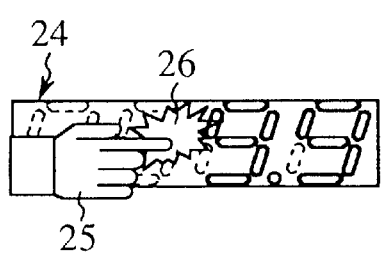
FIG. 24(a)–24(c) is a screen layout showing an example of a display screen according to the eight embodiment of the present invention.
Figure 24B:
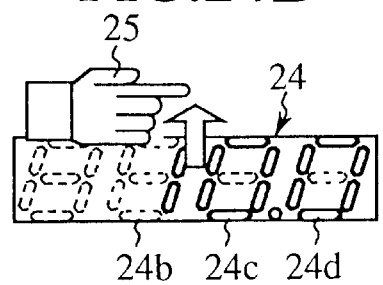
Figure 24C:
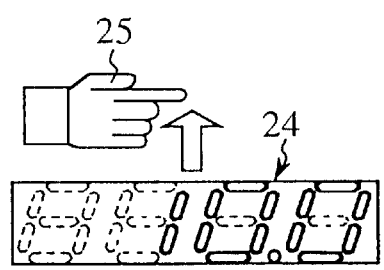
Figure 23:
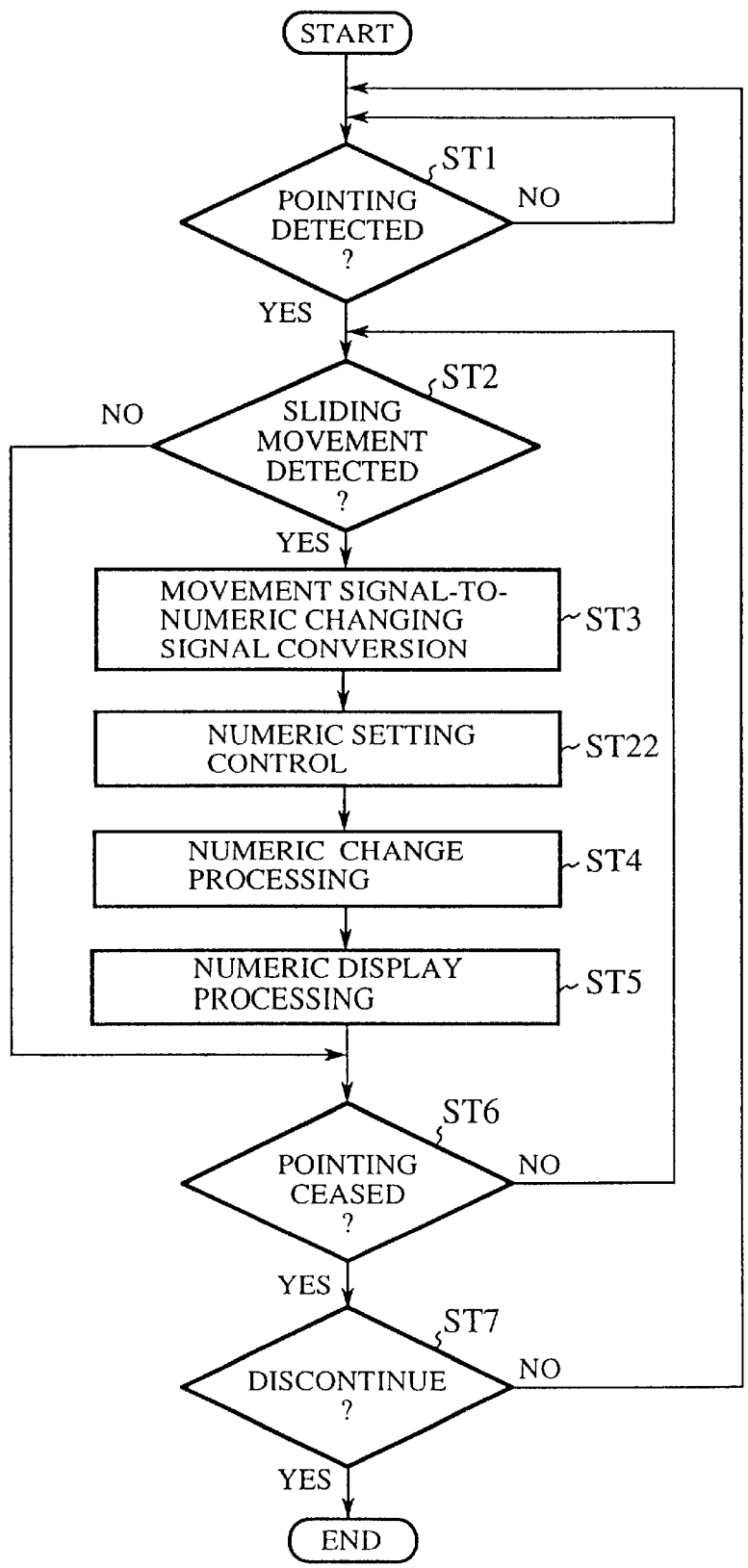
FIG. 23 is a flowchart depicting the operation of numeric changing means according to the eighth embodiment of the present invention.

Next, the operation of this embodiment will be described below. FIG. 23 is a flowchart showing operations of the numeric changing means 8 in this embodiment. In FIG. 23, ST22 is a step of controlling the set value by the numeric setting control part 20 to keep it within the numeric range. The other steps are identical with those in Embodiment 1, and are identified by the same reference numerals, but no description will be given of them. FIG. 24 is a screen layout depicting an example of the display screen according to Embodiment 8. The display elements shown in FIG. 24 are identical with those in Embodiment 1, and are identified by the same reference numerals, but no description will be repeated. Upon sliding the finger upward on the touch panel after touching an area corresponding to the numeric display area 24 of the display device 1 to select the value to be changed (FIG. 24($a$)), the set value is changed to the maximum value corresponding to the finger sliding movement (FIG. 24($c$)). The subsequent finger sliding movement will not update the set value (FIG. 24($d$)). For example, when the minimum and maximum values are preset at 0 and 100, respectively, the set value will not go out of this range, no matter how much it is changed by finger sliding movement.

As described above, according to Embodiment 8, since the range over which to change the set value is preset, it is possible to prevent that the numeric value on display is changed to a value outside the preset numeric range. Hence, the apparatus of this embodiment is of great utility when employed in process control, in particular, in a plant control system for which it is absolutely necessary to ensure safety.

EMBODIMENT 9

FIG. 25 is a block diagram illustrating the configuration of a numeric value changing apparatus according to a ninth embodiment (Embodiment 9). Reference numeral 21 denotes a pointed digit or figure detection part which is supplied with the pointing signal from the pointing device 2 and outputs it as a digit pointing signal when the selected position information contained in the input pointing signal indicates a predetermined digit display section (for example, 24$a$) in the numeric display area 24. This embodiment is identical in construction with Embodiment 1 except the above. The parts corresponding to those in Embodiment 1 are identified by the same reference numerals, and no description will be repeated.

Figure 26:
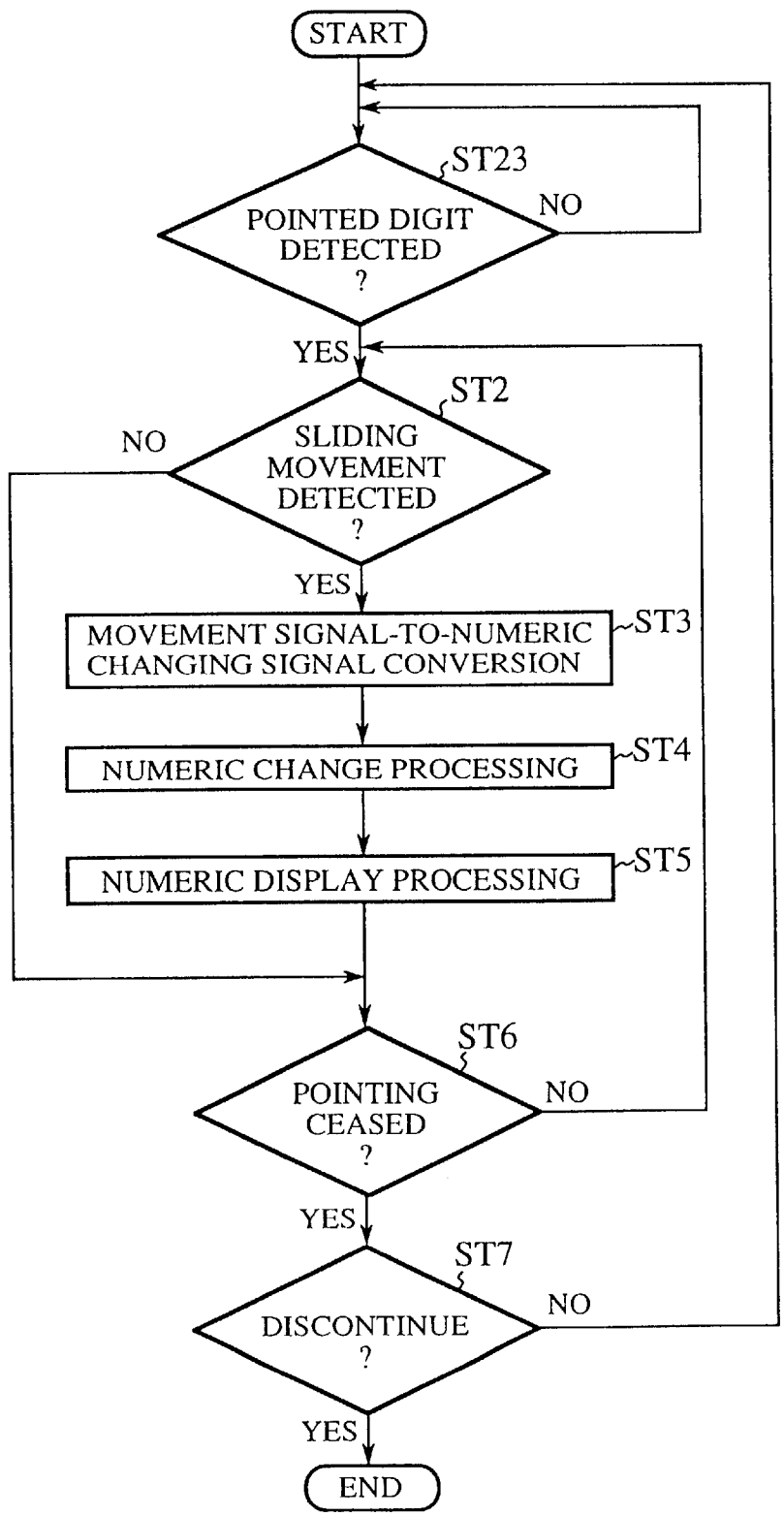
FIG. 26 is a flowchart depicting the operation of numeric changing means according to the ninth embodiment of the present invention.

Next, the operation of this embodiment will be described below. FIG. 26 is a flowchart showing operations of the numeric changing means 8 in this embodiment. In FIG. 26, ST23 is a step of making a check to see if the pointed digit detection part 21 has detected the pointed digit of the numeric value on display. The other steps are identical with those in Embodiment 1, and are identified by the same reference numerals, but no description will be given of them. FIG. 27 is a screen layout depicting an example of the display screen according to Embodiment 9. The display elements shown in FIG. 27 are identical with those in Embodiment 1, and are identified by the same reference numerals, but no description will be repeated. Upon sliding the finger on the touch panel after touching a predetermined one of digit display sections (24$a$, 24$b$, 24$c$ and 24$d$) in an area corresponding to the numeric display area 24 of the display device 1 (FIG. 27($a$)) to select the numeral to be changed (FIGS. 27($b$)), the numeral of the selected digit display section is changed independently in response to the finger sliding movement (FIGS. 27($c$), ($d$)). For example, in the case of changing a set value from "103" to "105", the first digit display section 24$c$ is selected first by pointing it with the finger, followed by sliding the finger to make a 3→4→5→ change. In the case of changing the current numeric value from "103" to "403," the third digit display section 24$a$ is selected first by pointing with the finger, after which the finger is slid to make a 1→2→3→4 change. Since the numeric value can be changed for each digit, it is possible to implement efficient numeric changing operation, for example, in the case of making a change the set value from "103" to "403."

As described above, according to Embodiment 9, the set value with plural figures can selectively be changed for each digit.

Accordingly, in the case of greatly changing the set value with many figures, too, the number of numeral candidates for each digit can be reduced, for example, to p10 (a decimal number). This embodiment provides the advantage of efficient and easy numeric change in a small panel display as well.

EMBODIMENT 10

Figure 28:
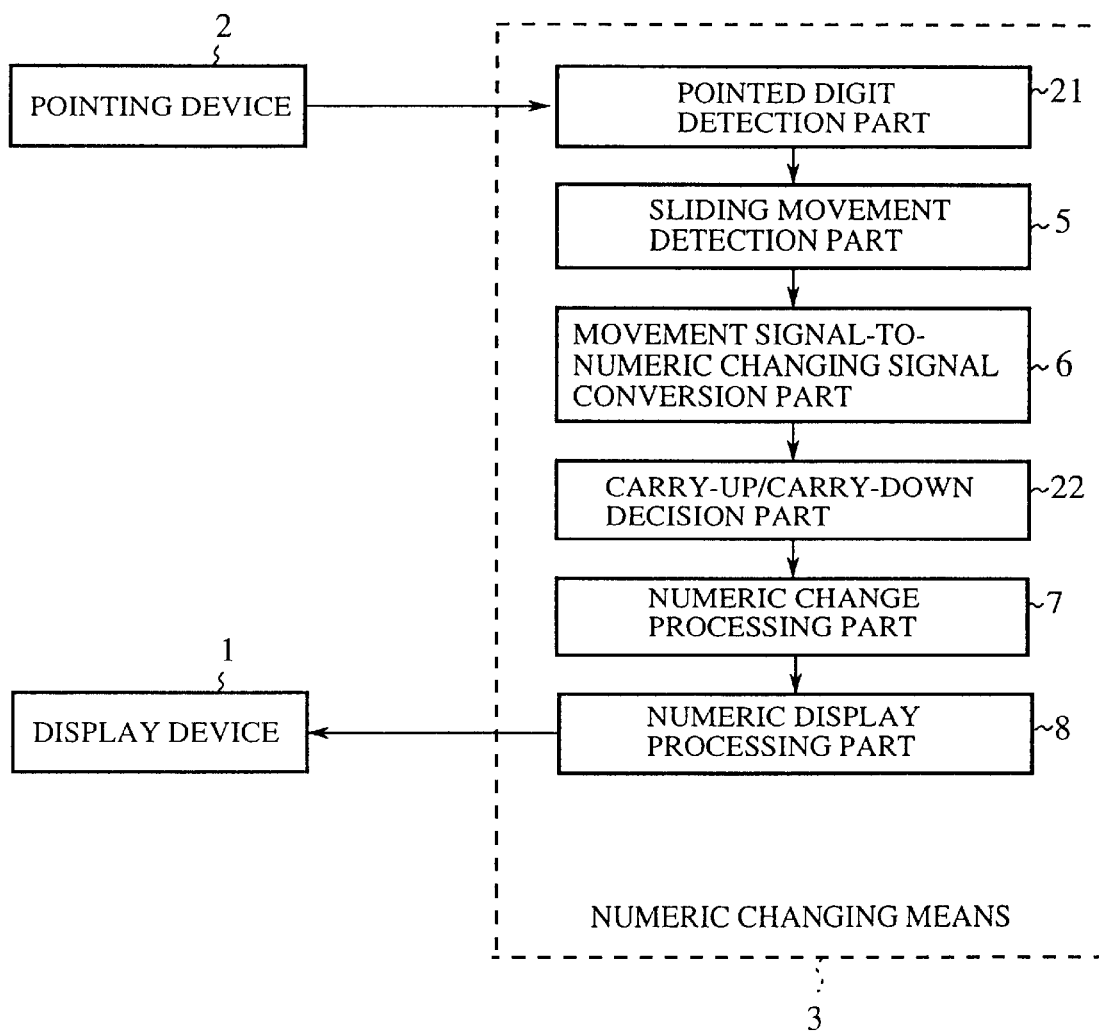
FIG. 28 is a block diagram illustrating the configuration of a numeric value changing apparatus according to a tenth embodiment of the present invention.

FIG. 28 is a block diagram illustrating the configuration of a numeric value changing apparatus according to a tenth embodiment (Embodiment 10). Reference numeral 22 denotes a carry-up/carry-down decision part which, upon occurrence of a carry-up or carry-down at each of the selected digits 24$b$, 24$c$ and 24$d$, outputs a numeric changing signal such that the numeral at the digit more significant than each selected digit is also changed accordingly. This embodiment is identical in construction with Embodiment 1 except the above. The parts corresponding to those in Embodiment 1 are identified by the same reference numerals, and no description will be repeated.

Figure 29:
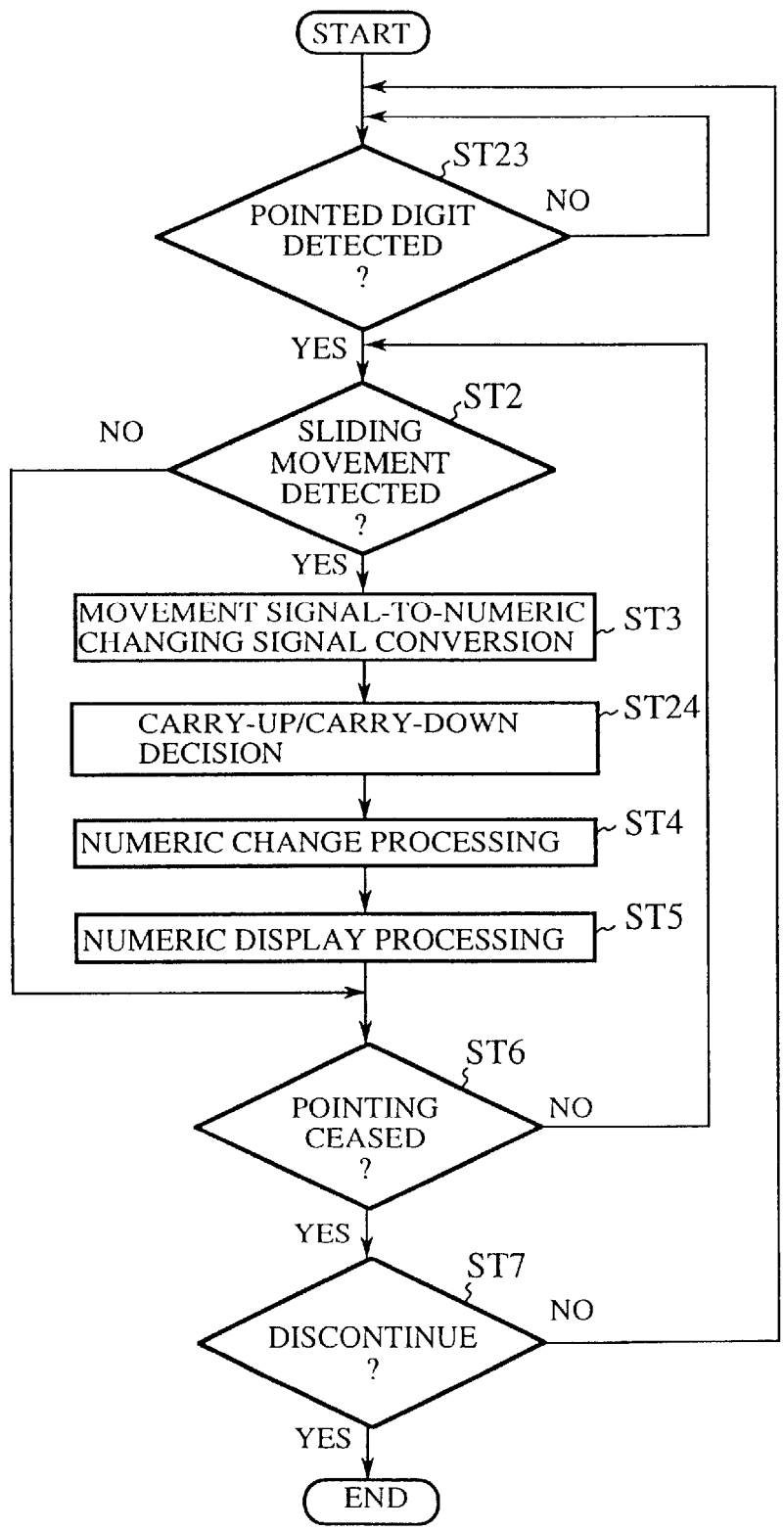
FIG. 29 is a flowchart depicting the operation of numeric changing means according to the tenth embodiment of the present invention.
Figure 30A:
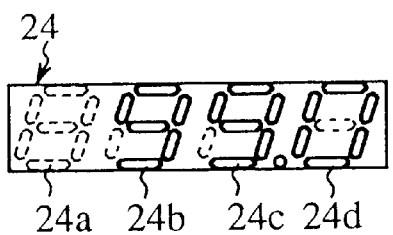
FIG. 30(a)–(d) is a screen layout showing an example of a display screen according to the tenth embodiment of the present invention.
Figure 30B:
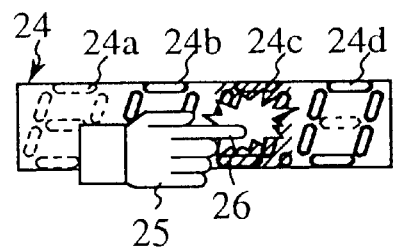
Figure 30C:
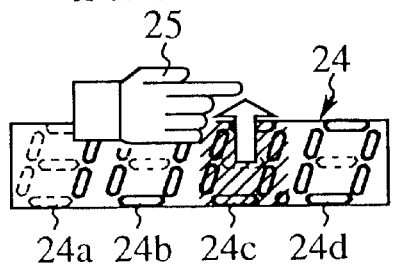
Figure 30D:
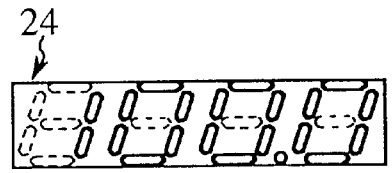
Figure 34:
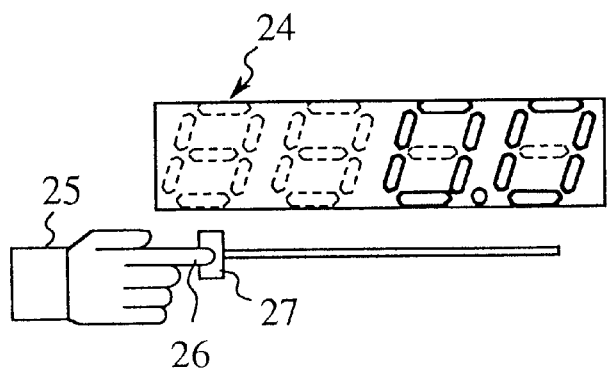
FIG. 34 is a screen layout depicting an example of a display screen according to the prior art.
Figure 35:
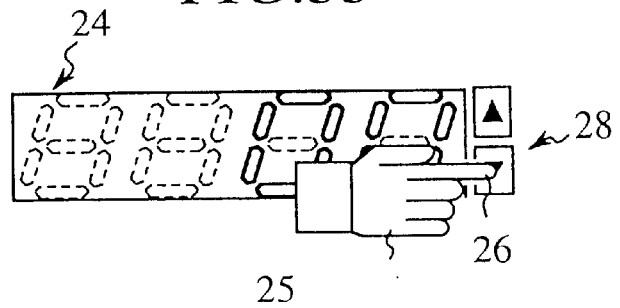
FIG. 35 is a screen layout depicting another example of a display screen according to the prior art.

Next, the operation of this embodiment will be described below. FIG. 29 is a flowchart showing operations of the numeric changing means 8 in this embodiment. In FIG. 29, ST24 is a step of determining by the carry-up/carry-down decision part 22 as to whether to change numerals at the digits 24$a$, 24$b$ and 24$c$ more significant than the selected digits 24$b$, 24$c$ and 24$d$, respectively. The other steps are identical with those in Embodiment 1, and are identified by the same reference numerals, but no description will be given of them.

FIG. 30 is a screen layout depicting an example of the display screen according to Embodiment 10. The display elements shown in FIG. 30 are identical with those in Embodiment 1, and are identified by the same reference numerals, but no description will be repeated. Now, assume that a set value with a predetermined number of digits (three in this example) is being displayed in the numeric display area 24 of the display device 1 (FIG. 30($a$)). Upon sliding the finger upward on the touch panel after touching an area thereon (FIG. 30$b$)) corresponding to a selected one of the digit display sections 24$b$, 24$c$ and 24$d$ in the numeric display area 24, the numeral at the selected digit display section is changed with the upward sliding movement of the finger; at the same time, the associated high-order digit or digits are changed correspondingly (FIGS. 30(c), (d)). For example, in the case of changing a set value from "103" to "112", the first digit display section 24c is selected first by touching the corresponding area on the touch panel with the finger, followed by sliding the finger on the touch panel to make a change 3→4→. . . →9→0→1→2. In this instance, when the first digit undergoes a change 9→0, the numeral at the immediately high-order digit is automatically carried up from "0" to "1." Hence, the apparatus of this embodiment provides increased efficiency, in particular, when changing the set value, for example, from "109" to "111" or from "190" to "210."

As described above, according to Embodiment 10, by selectively changing the numeral at a desired one of plural digits of the set value, numeral at the associated high-order digit is changed correspondingly. This permits reduction of the number of numeral candidates for each digit in the case of greatly changing the set value with many figures, too. Also in the case of a small panel display device, efficient and easy numeric change can be made by selecting only a desired number of digits where to make changes.

EMBODIMENT 11

Figure 31:
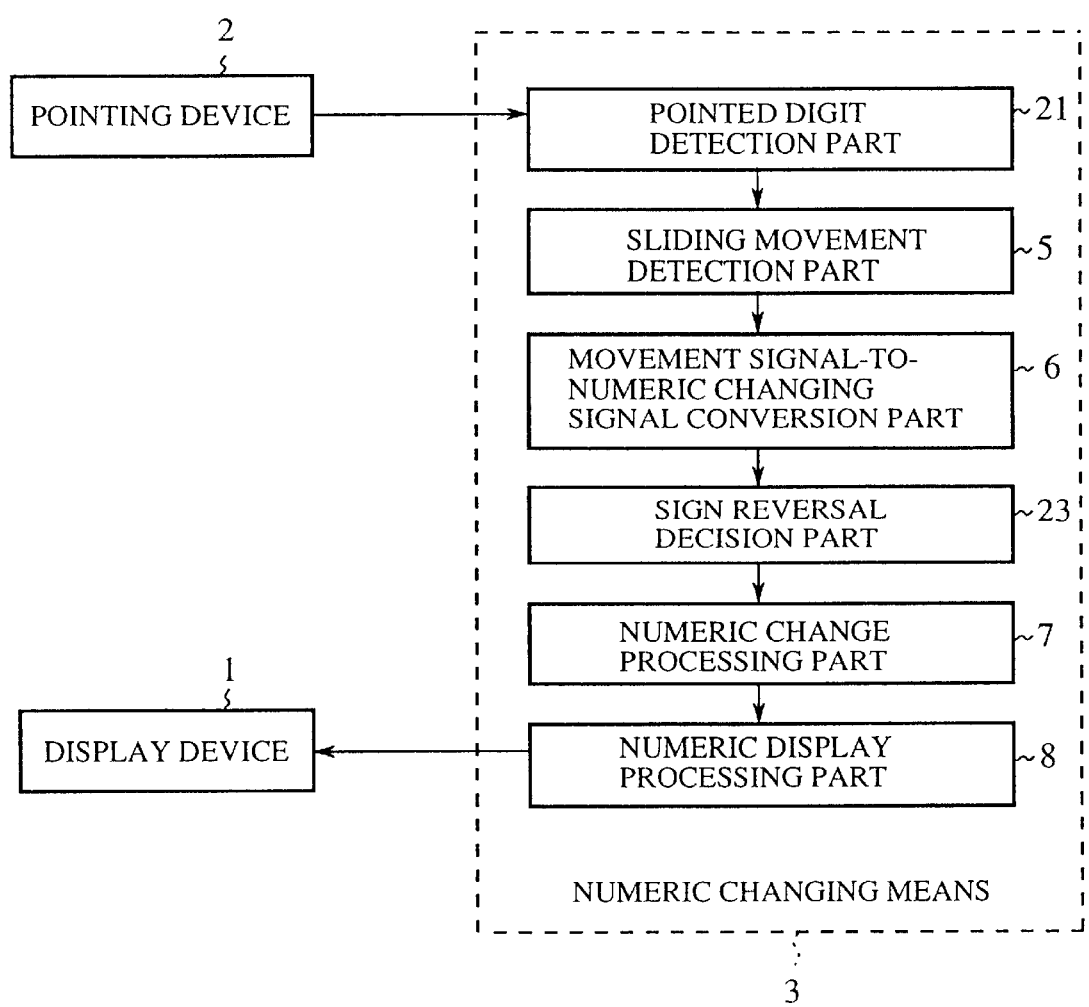
FIG. 31 is a block diagram illustrating the configuration of a numeric value changing apparatus according to an eleventh embodiment of the present invention.

FIG. 31 is a block diagram illustrating the configuration of a numeric value changing apparatus according to an eleventh embodiment (Embodiment 11). Reference numeral 23 denotes a sign reversal decision part which outputs a signal for changing the sign of the set value when supplied with a numeric change signal beyond the numeric changing range when the most significant digit of the set value is being selected. This embodiment is identical in construction with Embodiment 1 except the above. The parts corresponding to those in Embodiment 1 are identified by the same reference numerals, and no description will be repeated.

Figure 32:
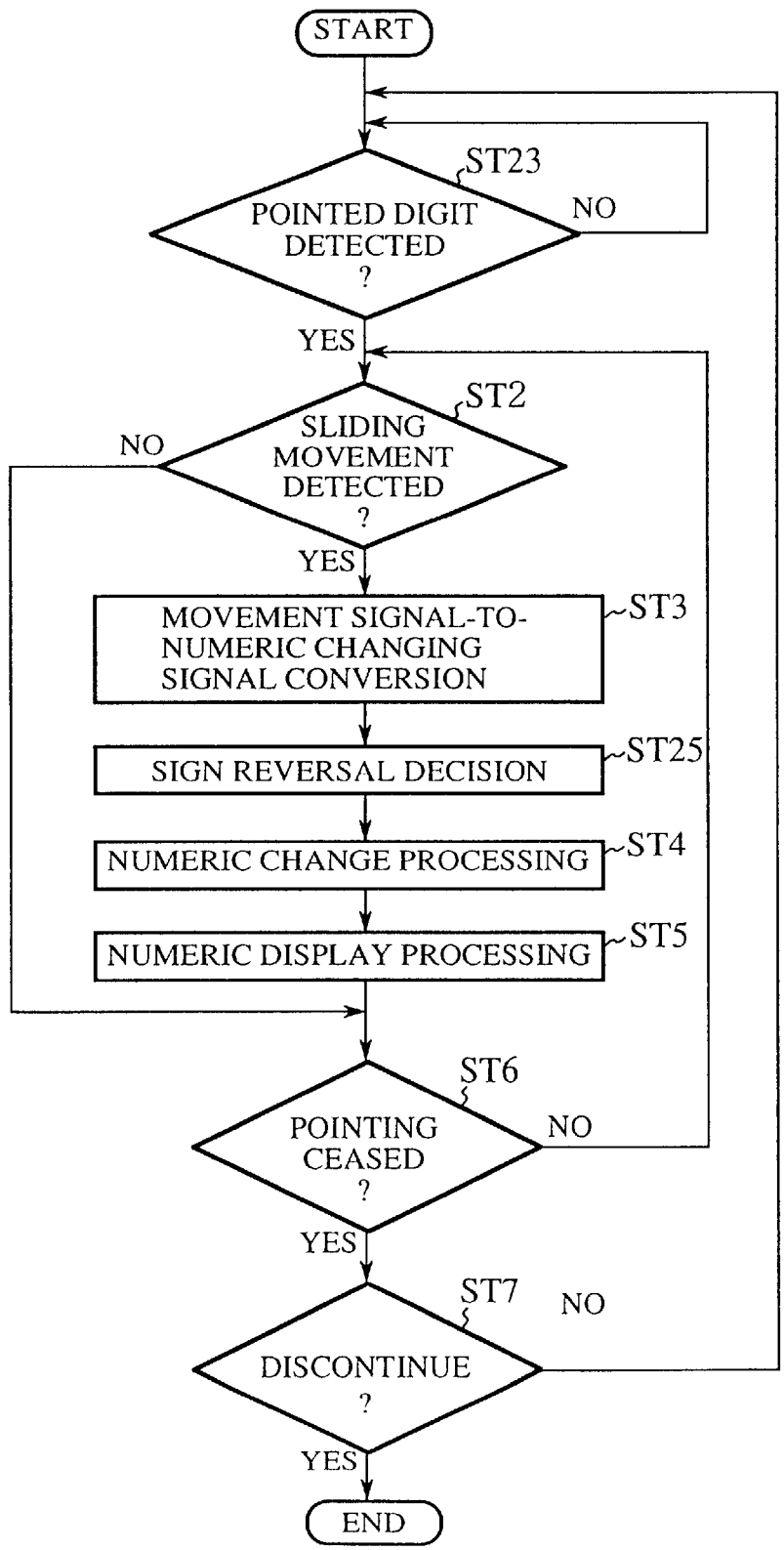
FIG. 32 is a flowchart depicting the operation of numeric changing means according to the eleventh embodiment of the present invention.
Figure 33A:
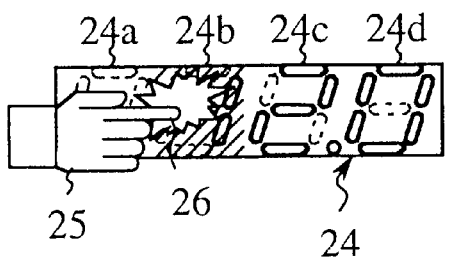
FIG. 33(a)–(f) is a screen layout showing an example of a display screen according to the eleventh embodiment of the present invention.
Figure 33B:
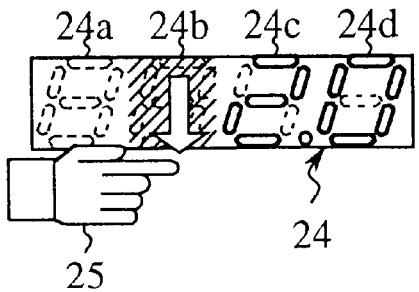
Figure 33C:
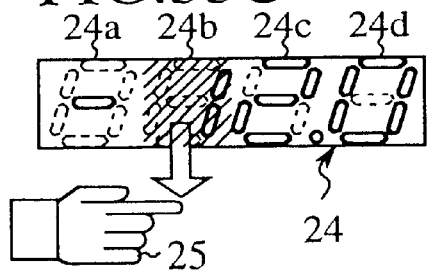
Figure 33D:
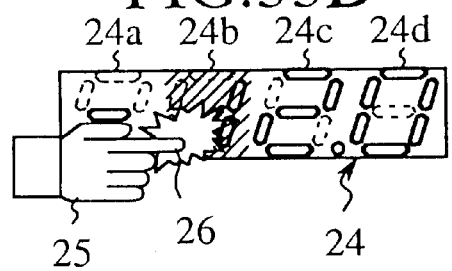
Figure 33E:
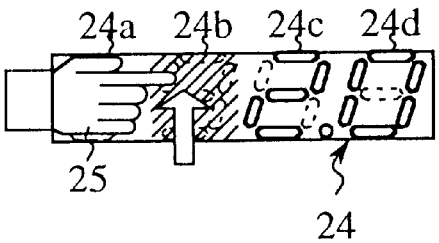
Figure 33F:
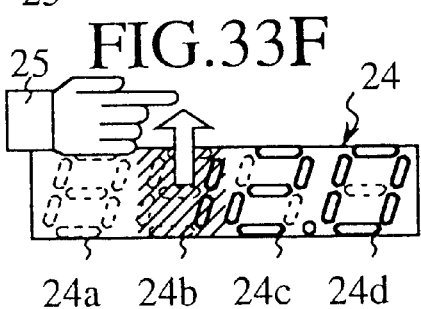

Next, the operation of this embodiment will be described below. FIG. 32 is a flowchart showing operations of the numeric changing means 3 in this embodiment. In FIG. 32, ST25 is a step of outputting from the sign reversal decision part 23 the signal for changing the sign of the set value when the most significant digit of the value is updated beyond the numeric changing range. The other steps are identical with those in Embodiment 1, and are identified by the same reference numerals, but no description will be given of them.

FIG. 33 is a screen layout depicting an example of the display screen according to Embodiment 11. The display elements shown in FIG. 33 are identical with those in Embodiment 1, and are identified by the same reference numerals, but no description will be repeated. Upon sliding the finger on the touch panel (FIG. 33(b)) after selecting the most significant digit (the second digit 24b in this example) (FIG. 33(a)), the sign of the set value is reversed. When sliding the finger in the opposite direction, the sign of the set value is changed to the sign opposite to the above. For example, in the case of changing a set value from "203" to "–203", the third digit display section is selected first by touching the corresponding area on the touch panel with the finger, followed by sliding the finger on the touch panel to make a change 2→1→0→-1→-2. In this instance, when the third digit undergoes a change 1→0→-1, sign changing processing is performed. When the third digit goes to "0,"the numeric display is provided as "3" not as "003," but the numeral at the third digit is handled as if a "0" is displayed. Hence, the apparatus of this embodiment provides increased efficiency, in particular, when changing the set value, for example, from "100" to "–100" or from "–100" to "100."

As described above, according to Embodiment 11, since the sign of the numeric value is changed corresponding to a change of the numeral of the most significant digit, the sign can be changed efficiently and easily.

While in the above the preferred embodiments of the present invention have been described, they are intended as merely illustrative of the invention, and it should be construed that many modifications and variations may be effected without departing from the spirits and scope of the claims appended hereto.

What is claimed is:

1. A method of changing numeric values displayed on a display device, comprising the steps of:

providing a pointing device that outputs an instantaneous position signal when a user points to a position in a display area of said display device, said instantaneous position signal indicating an instantaneous position selected by said pointing by said user;

detecting a change in value of said instantaneous position signal as said user changes the position of pointing in said display area; and changing said numeric values displayed on said display device when a change in value of said instantaneous position signal is detected.

2. The numeric value changing method according to claim 1, wherein said numeric values are updated in accordance with the distance of movement of said instantaneous position as indicated by said change in value.

3. The numeric value changing method according to claim 1, wherein the amount of change of said numeric values changes with the speed of movement of said pointing device over said display area.

4. The numeric value changing method according to claim 1, wherein a direction of change of said numeric values is determined by the direction of movement of said pointing device over said display area.

5. The numeric value changing method according to claim 1, wherein a direction of change of said numeric values is determined by a change in the direction of movement of said pointing device over said display area.

6. The numeric value changing method according to claim 1, wherein said numeric values are changed with a change of said instantaneous position signal until said display area is deselected.

7. The numeric value changing method according to claim 1, wherein said numeric values have a plurality of digits, and are selectable by said pointing device for each digit.

8. The numeric value changing method according to claim 7, wherein said instantaneous position signal changes with sliding movement of said pointing device over a desired area on said display area after said user points to a position corresponding to a desired one of said display elements by using said pointing device.

9. A numeric value changing apparatus, comprising:

a display device having a display area on which are displayed numeric values;

a pointing device for outputting an instantaneous position signal that indicates an instantaneous position selected by said pointing device in said display area; and a numeric changing section supplied with said instantaneous position signal, for changing said displayed numeric values as a function of a change of said instantaneous position signal within said display area.

* * * * *

UNITED STATES PATENT AND TRADEMARK OFFICE
CERTIFICATE OF CORRECTION

PATENT NO.    : 6,310,613 B1                                                    Page 1 of 1
DATED         : October 30, 2001
INVENTOR(S)   : Masato Tanaka et al.

It is certified that error appears in the above-identified patent and that said Letters Patent is hereby corrected as shown below:

Column 6,
Line 42, delete "signalto-numeric" and substitute therefor -- signal-to-numeric --.

Column 16,
Line 30, delete "p10" and substitute therefor -- 10 --.

Signed and Sealed this

Eighteenth Day of February, 2003

JAMES E. ROGAN
*Director of the United States Patent and Trademark Office*